(12) United States Patent
Kooijman et al.

(10) Patent No.: US 9,399,908 B2
(45) Date of Patent: Jul. 26, 2016

(54) SYSTEMS AND METHOD FOR SEPARATING DIMETHYL ETHER FROM OIL AND WATER

(71) Applicant: SHELL OIL COMPANY, Houston, TX (US)

(72) Inventors: Hendrik Adriaan Kooijman, Amsterdam (NL); Gosina Geertruida Burggraaf, Amsterdam (NL)

(73) Assignee: Shell Oil Company, Houston, TX (US)

( * ) Notice: Subject to any disclaimer, the term of this patent is extended or adjusted under 35 U.S.C. 154(b) by 218 days.

(21) Appl. No.: 14/278,334

(22) Filed: May 15, 2014

(65) Prior Publication Data

US 2014/0338904 A1    Nov. 20, 2014

Related U.S. Application Data

(60) Provisional application No. 61/824,636, filed on May 17, 2013.

(51) Int. Cl.
| | |
|---|---|
| B01D 19/00 | (2006.01) |
| B01D 53/14 | (2006.01) |
| B01D 53/18 | (2006.01) |
| E21B 43/40 | (2006.01) |
| C10G 7/04 | (2006.01) |
| B01D 11/04 | (2006.01) |
| C02F 1/20 | (2006.01) |
| C02F 1/26 | (2006.01) |
| C02F 103/36 | (2006.01) |

(52) U.S. Cl.
CPC ............ *E21B 43/40* (2013.01); *B01D 19/0005* (2013.01); *B01D 19/0036* (2013.01); *B01D 53/1487* (2013.01); *B01D 53/18* (2013.01); *C10G 7/04* (2013.01); *B01D 11/04* (2013.01); *B01D 2252/103* (2013.01); *B01D 2256/24* (2013.01); *C02F 1/20* (2013.01); *C02F 1/26* (2013.01); *C02F 2103/365* (2013.01)

(58) Field of Classification Search
CPC ............... B01D 11/04; B01D 19/0005; B01D 19/0036; B01D 19/0073; B01D 2252/103; B01D 2256/24; B01D 53/1487; B01D 53/18; C02F 1/20; C02F 1/26; C02F 2103/365; C10G 7/04; E21B 43/40
See application file for complete search history.

(56) References Cited

U.S. PATENT DOCUMENTS

| | | | |
|---|---|---|---|
| 4,587,373 A | 5/1986 | Hsia | |
| 7,132,580 B1 * | 11/2006 | Senetar | ..................... C07C 1/20 208/291 |
| 8,207,387 B2 | 6/2012 | McGlamery, Jr. et al. | |
| 2004/0064009 A1 | 4/2004 | Borgmann et al. | |
| 2004/0215043 A1 | 10/2004 | Senetar | |

* cited by examiner

*Primary Examiner* — Duane Smith
*Assistant Examiner* — Cabrena Holecek
(74) *Attorney, Agent, or Firm* — Richard B. Taylor

(57) ABSTRACT

A system is provided for removing dimethyl ether (DME) from oil, water or brine and gas that includes a gas-oil-water separation module, a DME absorber, a water stripper, a liquid-liquid extractor, a water source, and an oil stripper, and a process is provided for separating DME from a mixture of DME, crude oil, water or brine, and a gas containing alkane hydrocarbons. A DME lean oil containing at most 1 ppmwt may be produced by the process.

18 Claims, 6 Drawing Sheets

SYSTEMS AND METHOD FOR SEPARATING DIMETHYL ETHER FROM OIL AND WATER

PRIORITY

This application claims priority from U.S. Provisional Application Ser. No. 61/824,636 filed May 17, 2013, which is hereby incorporated by references in its entirety.

FIELD OF THE INVENTION

The present invention is directed to a system and a method for separating dimethyl ether from a mixture of dimethyl ether, oil, and water or brine, and a gas comprising alkane hydrocarbons, and particularly for separating dimethyl ether from mixtures of dimethyl ether, oil, and water or brine, and gas produced from an oil-bearing formation.

BACKGROUND OF THE INVENTION

Enhanced Oil Recovery (EOR) may be used to increase oil recovery in oil fields worldwide. One type of EOR process utilizes one or more chemical solvents to enhance oil recovery from an oil-bearing formation. The chemical solvent is selected to be soluble or miscible with oil in the formation and to have a lower viscosity than the oil in the formation so that the viscosity of the oil in the formation is reduced upon mixing with the solvent. The solvent is injected into the formation to mix with the oil, reducing the viscosity of the oil and mobilizing the oil for production from the formation. Chemical solvent EOR processes may boost the oil recovery factor from an oil-bearing formation and may extend the oil-producing life of the formation.

Dimethyl ether (DME) has been disclosed as a chemical solvent for use in EOR processes to recover oil from subterranean oil-bearing formations. When DME is used as an EOR agent, DME is produced from the formation in a mixture with oil and water or brine. The DME must be separated from the oil phase of the produced mixture to provide a DME uncontaminated oil for refining, where the DME uncontaminated oil may contain only minute quantities of DME.

Separation of DME from oil to produce DME uncontaminated oil, however, has proven difficult. A portion of the DME may be separated from the oil phase of a produced mixture of DME, oil, and water or brine by using a degasser to reduce the Reid Vapor Pressure of the oil phase. In the degasser, the oil phase is heated and flashed to separate volatile DME from the less volatile components of the oil phase. However, this process only removes a maximum of 50% of the DME from the oil—which is insufficient to provide an oil uncontaminated with DME for refining.

What is needed is a system and a process for separating DME from a mixture of DME, oil, and water or brine, where substantially all of the DME may be separated from the oil phase of the mixture. When DME is used as an EOR agent to promote recovery of oil from an oil-bearing formation, what is further needed is a system and a process in which substantially all of the DME may be recovered from a mixture of DME, oil, and water or brine produced from the formation for reintroduction into the formation.

SUMMARY OF THE INVENTION

In one aspect, the present invention is directed to a system comprising a gas-oil-water separation module, a dimethyl ether (DME) absorber, a water stripper, a liquid-liquid extractor, a water source, and an oil stripper. The gas-oil-water separation module is configured to receive a mixture comprised of DME, crude oil, water or brine, and a gas comprising alkane hydrocarbons, and is further configured to separate from the mixture: a gas comprising DME and alkane hydrocarbons, an oil phase comprising crude oil and DME, and an aqueous phase comprising water or brine and DME. The water stripper is operatively fluidly coupled to the gas-oil-water separation module configured to receive the separated aqueous phase therefrom. The water stripper is also operatively fluidly coupled to the DME absorber to receive a portion of a DME lean gas therefrom. The water stripper is configured to contact the separated aqueous phase received therein with the DME lean gas received therein to produce a DME lean water or brine containing less DME than the separated aqueous phase received therein and a first DME enriched gas containing more DME than the DME lean gas received therein, wherein the water stripper is operatively fluidly coupled to the DME absorber to provide the first DME enriched gas to the DME absorber. The oil stripper is operatively fluidly coupled to the gas-oil-water separation module and is configured to receive the separated oil phase comprising crude oil and DME therefrom. The oil stripper is also operatively fluidly coupled to the DME absorber to receive a portion of the DME lean gas therefrom. The oil stripper is configured to contact the separated oil phase received therein with the DME lean gas received therein to produce oil containing less DME that the separated oil phase received therein and to produce a second DME enriched gas containing more DME than the DME lean gas received therein, wherein the oil stripper is operatively fluidly coupled to the DME absorber to provide the second DME enriched gas to the DME absorber. The DME absorber is operatively fluidly coupled to the gas-oil-water separation module to receive at least a portion of the gas comprising DME and alkane hydrocarbons therefrom. The DME absorber is also operatively fluidly coupled to the water stripper to receive at least a portion of the first DME enriched gas therefrom, and is operatively fluidly coupled to the oil stripper to receive at least a portion of the second DME enriched gas therefrom. The DME absorber is also operatively fluidly coupled to the water source to receive water from the water source. The DME absorber is configured to contact the gas comprising DME and alkane hydrocarbons from the gas-oil-water separation module and the first and second DME enriched gases with water from the water source to produce: the DME lean gas, wherein the DME lean gas contains less DME than the gas from the gas-oil-water separation module; a DME absorber aqueous stream comprising water or brine and DME, wherein the DME absorber aqueous stream contains more DME than the water received by the DME absorber from the water source; and a DME absorber liquid hydrocarbon stream comprising DME and alkane hydrocarbons. The liquid-liquid extractor (LLE) is operatively fluidly coupled to the DME absorber to receive the DME absorber liquid hydrocarbon stream from the DME absorber and is operatively fluidly coupled to the water source to receive water or brine from the water source. The LLE is configured to contact the DME absorber liquid hydrocarbon stream and the water or brine received therein to produce a LLE liquid hydrocarbon stream and a LLE aqueous stream, wherein the LLE liquid hydrocarbon stream is comprised of alkane hydrocarbons and contains less DME than the DME absorber liquid hydrocarbon stream, and wherein the LLE aqueous stream is comprised of DME and water or brine.

In another aspect, the present invention is directed to a process. A mixture comprised of dimethyl ether (DME), crude oil, water or brine, and a gas comprising alkane hydrocarbons is provided. A gas comprised of alkane hydrocarbons and DME, an oil phase comprised of crude oil and DME, and an aqueous phase comprised of water and DME are separated from the mixture. The gas separated from the mixture and first and second DME enriched gases are contacted with water or brine to produce: a DME lean gas comprising alkane hydrocarbons, a first aqueous stream comprising DME and water or brine, and a first liquid hydrocarbon stream comprising DME and liquid hydrocarbons. The DME lean gas contains less DME than the gas separated from the mixture, and the first aqueous stream contains more DME than the water or brine contacted with the gas separated from the mixture. The first liquid hydrocarbon stream is contacted with water or brine in a liquid-liquid extractor (LLE) to produce a second liquid hydrocarbon stream comprising alkane hydrocarbons and a second aqueous stream comprising DME and water or brine, where the second liquid hydrocarbon stream contains less DME than the first liquid hydrocarbon stream. The aqueous phase separated from the mixture is contacted with a portion of the DME lean gas to produce DME lean water and the first DME enriched gas, where the DME lean water contains less DME than the aqueous phase separated from the mixture and the first DME enriched gas contains more DME than the DME lean gas. The oil phase separated from the mixture is contacted with a portion of the DME lean gas to produce DME lean oil and the second DME enriched gas, where the DME lean oil contains less DME than the oil phase separated from the mixture and the second DME enriched gas contains more DME than the DME lean gas.

Additional advantages and other features of the present disclosure will be set forth in part in the description which follows and in part will become apparent to those having ordinary skill in the art upon examination of the following or may be learned from the practice of the disclosure. The advantages of the disclosure may be realized and obtained as particularly pointed out in the appended claims.

As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF THE INVENTION

Figure 1:
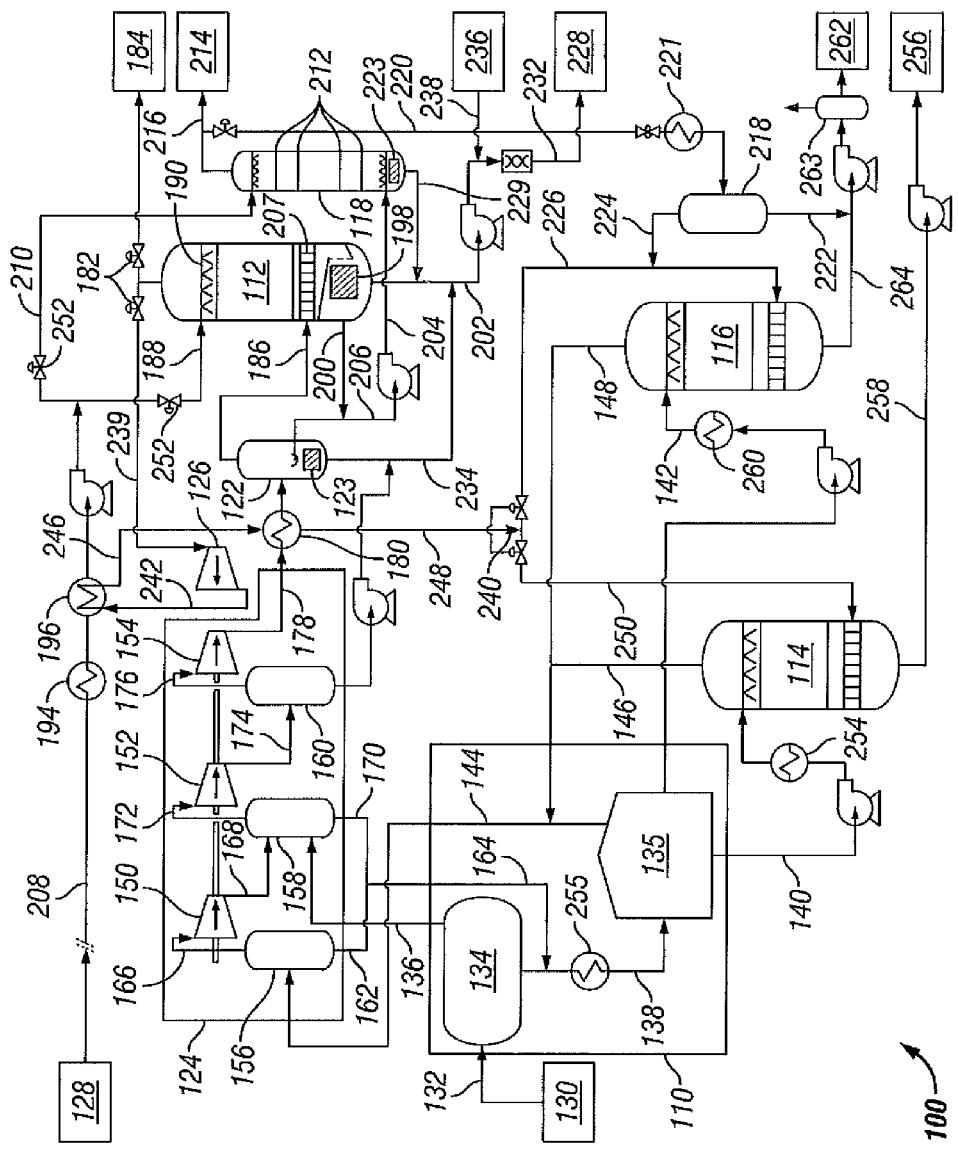
FIG. 1 is a diagram illustrating a system for separating DME, oil, water or brine and gas from a mixture according to an embodiment of the present disclosure.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, and/or components, have been described at a relatively high-level, without detail, in order to avoid unnecessarily obscuring aspects of the present teachings.

The present disclosure describes a system and method of separation of DME from a mixture of DME, crude oil, water or brine, and a gas comprised of alkane hydrocarbons. The system comprises a gas-oil-water separation module, a DME absorber, a water stripper, a liquid-liquid extractor, an oil stripper, and a water source. In a preferred embodiment, the system may include further components including a compressor, a high pressure separator, means for expanding a gas, and heating and cooling components. Use of the system of the present invention in accordance with the method of the present invention enables the separation of crude oil containing a low concentration of DME from a mixture of crude oil, DME, water or brine, and gas. The mixture of crude oil, DME, water or brine, and gas may be produced from an oil-bearing formation where DME may be removed from the separated crude oil such that the crude oil contains, at most, minute quantities of DME, and is uncontaminated by DME for refining purposes. The crude oil produced by the process of the present invention, preferably utilizing the system of the present invention, may contain less than 1 part per million, by weight, (hereafter "ppmwt") DME or less than 100 parts per billion, by weight, (hereafter "ppbwt") DME. This facilitates the use of DME as a chemical solvent for use in enhanced oil recovery from an oil-bearing formation since the DME may be separated from the oil, and, preferably, may be recovered and reused in the EOR process.

As used herein, when two or more elements are described as "operatively fluidly coupled", the elements are defined to be directly or indirectly connected to allow direct or indirect fluid flow between the elements. The term "fluid flow", as used in this definition, refers to the flow of a gas or a liquid; the term "direct fluid flow" as used in this definition means that the flow of a liquid or a gas between two defined elements flows directly between the two defined elements; and the term "indirect fluid flow" as used in this definition means that the flow of a liquid or a gas between two defined elements may be directed through one or more additional elements to change one or more aspects of the liquid or gas as the liquid or gas flows between the two defined elements. Aspects of a liquid or a gas that may be changed in indirect fluid flow include physical characteristics, such as the temperature or the pressure of a gas or a liquid; the state of the fluid between a liquid and a gas; and/or the composition of the gas or liquid. "Indirect fluid flow", as defined herein, excludes changing the composition of the gas or liquid between the two defined elements by chemical reaction, for example, oxidation or reduction of one or more elements of the liquid or gas.

Referring now to FIG. 1, an example of a system 100 of the present invention is shown. The system 100 comprises a gas-oil-water separation module 110, a DME absorber 112, a water stripper 114, an oil stripper 116, a liquid-liquid extractor 118, a water source 128, and may comprise a high pressure separator 122, a compressor 124, and means for expanding a gas 126.

The gas-oil-water separation module 110 is configured to receive a mixture comprised of DME, crude oil, water or brine, and a gas comprising alkane hydrocarbons, for example through inlet 132. As described in further detail below, the mixture may be produced from an oil-bearing formation through an oil production well 130 and provided to the gas-oil-water separation module 110.

The gas-oil-water separation module 110 is configured to separate from the mixture received therein: a gas comprising DME and alkane hydrocarbons, a liquid oil phase comprising crude oil and DME, and a liquid aqueous phase comprising water or brine and DME. The DME absorber 112 is operatively fluidly coupled to the gas-oil-water separation module 110, for example through the compressor 124 and the high pressure separator 122, to receive the gas separated from the mixture in the gas-oil-water separation module 110. The water stripper 114 is operatively fluidly coupled to the gas-oil-water separation module 110 to receive the liquid aqueous phase separated from the mixture in the gas-oil-water separation module, for example through conduit 140, and the oil stripper 116 is operatively fluidly coupled to gas-oil-water separation module to receive the liquid oil phase separated from the mixture in the gas-oil-water separation module, for example through conduit 142.

The gas-oil-water separation module 110 may be comprised of a plurality of separation units. For example, the gas-oil-water separation module 110 may be comprised of a high pressure separation unit 134 and a low pressure separation unit 135. The high pressure separation unit 134 may be configured to receive the mixture of crude oil, water or brine, DME, and gas. The high pressure separation unit 134 may be configured to separate a gas comprising DME and alkane hydrocarbons from the mixture. The high pressure separation unit 134 may be a conventional high pressure liquid-gas separator. The low pressure separation unit 135 may be operatively fluidly coupled to the high pressure separation unit 134 via conduit 138 and configured to receive from the high pressure separation unit 134 a substantially degassed mixture comprised of a liquid oil phase comprising crude oil and DME and a liquid aqueous phase comprising water or brine and DME, where the substantially degassed mixture is the mixture of crude oil, water or brine, DME, and, optionally, gas. The low pressure separation unit 135 may be a conventional water-knockout vessel.

The high pressure separation unit 134 may be configured to separate the gas comprised of gaseous DME and gaseous alkane hydrocarbons from the mixture of crude oil, water or brine, DME, and gas at a pressure substantially elevated above atmospheric pressure. The mixture may be provided from an oil-bearing formation to the high pressure separation unit 134 of the gas-oil-water separation module 110 at a pressure about the pressure that the mixture is produced from the formation. The high pressure separation unit 134 may be configured to operate to separate the gas comprising DME and alkane hydrocarbons from the mixture at or near the pressure the mixture is provided from an oil-bearing formation to the gas-oil-water separation module. In an embodiment, the high pressure separation unit 134 may be configured to operate to separate the gas comprising DME and alkane hydrocarbons from the mixture at a pressure of at least 2 MPa, or at a pressure of from 2 MPa to 4 MPa.

The low pressure separation unit 135 may be configured to separate the liquid aqueous phase comprising DME and water or brine and the liquid oil phase comprising crude oil and DME from the substantially degassed mixture received therein. The low pressure separation unit 135 may be configured to operate at a pressure of up to 0.35 MPa, and preferably is operated at a pressure at or near ambient pressure. Separation of the gas comprising DME and alkane hydrocarbons from the mixture in the high pressure separation unit 134 may reduce the pressure of the mixture to the operating pressure of the low pressure separation unit 135. Additional gas comprising DME, alkane hydrocarbons, or a mixture thereof may be separated from the liquid aqueous phase and from the liquid oil phase in the low pressure separation unit 135.

In another embodiment of the system of the present invention, the gas-oil-water separation module 110 may be comprised of a single separation vessel. The single separation vessel may be configured to receive the mixture comprising crude oil, water or brine, DME, and gas therein, and may be configured to separate a gas comprising DME and alkane hydrocarbons, a liquid oil phase comprising crude oil and DME, and a liquid aqueous phase comprising water or brine and DME. The single separation vessel may be a 3-phase separator effective to separate a gas, a liquid oil phase, and a liquid aqueous phase.

The gas comprising DME and alkane hydrocarbons separated from the mixture of DME, crude oil, water or brine, and gas in the gas-oil-water separation module 110 may be provided from the gas-oil-water separation module to the compressor 124. The compressor 124 may be operatively fluidly coupled to the gas-oil-water separation module 110, for example via conduits 136 and 144, and may be configured to receive the separated gases therefrom. The compressor 124 also may be operatively fluidly coupled to the water stripper 114 to receive a first DME enriched gas therefrom, for example through conduits 146 and 144; and may be operatively fluidly coupled to the oil stripper 116 to receive a second DME enriched gas therefrom, for example through conduits 148 and 144.

The compressor 124 may be configured to compress the first DME enriched gas, the second DME enriched gas, and the separated gas received from the oil-water-gas separation module 110 to produce a compressed stream comprising at least portions of the separated gas, the first DME enriched gas, and the second DME enriched gas. The compressor may be configured to mix and compress the first DME enriched gas, the second DME enriched gas, and the separated gas to a pressure of up to 4 MPa.

In one embodiment of the system of the present invention, the compressor 124 may be comprised of two or more compressor stages 150, 152, and 154 arranged to sequentially further compress the gas received therein, and one or more liquid knockouts 156, 158, and 160 fluidly operatively coupled to the compressor stages and configured to separate liquid from gas therein. A gas mixture comprised of the first DME enriched gas, the second DME enriched gas, and the gas separated from the substantially degassed mixture in the low pressure separation unit 135 may be received in the first liquid knockout 156, wherein any liquid entrained in the gas mixture may be separated from the gas mixture and returned to the low pressure separation unit via conduits 162, 164, and 138. The gas mixture may be provided from the first liquid knockout 156 to the first compressor stage 150 for compression via conduit 166. The gas mixture received in the first compressor stage 150 may have a pressure near or slightly above atmospheric pressure (e.g. from above 0.101 MPa to 0.35 MPa) and may be compressed therein to produce a first compressed stream having a pressure greater than the gas mixture. The first compressed stream may be provided to the second liquid knockout 158 via conduit 168. The gas comprising DME and alkane hydrocarbons separated in the high pressure separation unit 134 of the gas-oil-water separation module 110 may also be provided to the second liquid knockout 158, for example via conduit 136, and mixed with the first compressed stream therein. Any liquid entrained in gas provided from the high pressure separation unit 134 or in the first compressed stream may be separated in the second liquid knockout 158 and returned to the low pressure separation unit 135 of the gas-oil-water separation module 110 via conduits 170, 164, and 138. The mixture of the first compressed gas and gas from the high pressure separation unit 134 may be provided from the second liquid knockout 158 to the second compressor stage 152 for compression into a second compressed steam via conduit 172. The second compressed stream may be provided to the third liquid knockout 160 via conduit 174 wherein any liquid entrained in the second compressed stream may be separated from gas in the second compressed stream. The gas of the second compressed stream may be provided from the third liquid knockout 160 to a third compressor stage 154 for further compression into the compressed stream, for example via conduit 176.

Optionally, if no low pressure gas is separated from the low pressure separation unit 135, or if the gas-oil-water separation module is comprised of a single separation vessel, the gas comprising DME and alkane hydrocarbons separated from the high pressure separation unit 134 or the single separation vessel may be provided to the lowest pressure liquid knockout vessel and the initial compressor stage in the compressor train, where in FIG. 1 liquid knockout 156 and compressor stage 150 would be eliminated from the compressor 124.

The number of compressor stages and associated liquid knockouts in the compressor 124 may be selected to provide the compressed stream at a selected pressure. The compressed stream has an elevated pressure relative to the gas separated from the mixture in the gas-oil-water separation module 110. The compressed stream may have a pressure of from 1 MPa to 4 MPa, or from 2 MPa to 3 MPa.

Optionally, if the pressure of the gas phase of the mixture of oil, water or brine, gas, and DME provided to the high pressure separation unit 134 from an oil-bearing formation is sufficiently high, for example at least 2 MPa, the gas separated from the high pressure separation unit 134 may be provided directly to the high pressure separator 122 or directly to the DME absorber 112 without compression. In this embodiment, the gas phase separated from the liquid oil and water or brine in the gas-oil-water separator 110 may be mixed with the first DME enriched gas and the second DME enriched gas, where the combined gas phase from the mixture may be provided to the high pressure separator 122 or the DME absorber 112 without compression. In this embodiment, the system may not include a compressor 124. Alternatively, the separated gas phase of the mixture may be provided to the high pressure separator 122 or the DME absorber 112 without compression in a compressor, while the first DME enriched gas and/or the second DME enriched gas may be compressed in the compressor 124 prior to being provided to the high pressure separator 122 or DME absorber 112 along with the separated gas phase of the mixture.

The compressed stream may be provided from the compressor 124 to the high pressure separator 122, where the high pressure separator may be operatively fluidly coupled to the compressor to receive the compressed stream therefrom, for example through conduit 178. The high pressure separator 122 is configured to separate from the compressed stream: a high pressure gas mixture comprised of DME and alkane hydrocarbons; a high pressure separator liquid hydrocarbon stream comprised of DME and alkane hydrocarbons, and a high pressure separator liquid aqueous stream comprised of DME and water. The high pressure gas mixture separated in the high pressure separator may be comprised of a portion of the gas separated the gas-oil-water separation module 110, a portion of the first DME enriched gas, and a portion of the second DME enriched gas. The high pressure separator may be configured to separate the high pressure gas mixture, the high pressure separator liquid hydrocarbon stream, and the high pressure separator liquid aqueous stream from the compressed stream at a pressure of from 1 MPa to 4 MPa, or from 2 MPa to 3 MPa. A liquid-liquid separator 123, for example a plate pack, may be included in the high pressure separator to separate the high pressure separator liquid hydrocarbon stream from the high pressure separator liquid aqueous stream. The high pressure gas mixture separated from the compressed stream in the high pressure separator 122 has a greater pressure than the gas separated from the gas-oil-water separation module 110, the first DME enriched gas, and the second DME enriched gas.

A heat exchanger 180 may be operatively fluidly coupled to the compressor 124 and to the high pressure separator 122 configured to receive the compressed stream from the compressor, to cool the compressed stream, and to provide the cooled compressed stream to the high pressure separator. Utilization of the heat exchanger 180 in the system to cool the compressed stream is preferred to increase the amount of high pressure separator liquid hydrocarbon stream and high pressure separator liquid aqueous stream separated from the high pressure gas mixture in the high pressure separator 122. The heat exchanger 180 may be operatively fluidly coupled to the means for expanding a gas 126, to the water stripper 114, and to the oil stripper 116, configured to receive an expanded DME lean gas from the means for expanding a gas, to heat the expanded DME lean gas, and to provide the heated expanded DME lean gas to the water stripper and to the oil stripper. Heat may be exchanged between the compressed stream and the expanded DME lean gas in the heat exchanger 180 to cool the compressed gas and to heat the expanded DME lean gas. The amount of heat exchanged between the compressed stream and expanded DME lean gas may be controlled by the controlling the volume of DME lean gas provided to the means for expanding a gas 126 with a DME lean gas splitter valve 182, where a portion of the DME lean gas may be provided to the means for expanding a gas by the splitter valve 182 and another portion may be provided from the system to a natural gas pipeline or storage facility 184.

The DME absorber 112 is operatively fluidly coupled to the gas-oil-water separation module 110 to receive the separated gas comprising DME and alkane hydrocarbons therefrom, optionally in the high pressure gas mixture from the high pressure separator 122 via the compressor 124 and the heat exchanger 180. The DME absorber is operatively fluidly coupled to the water stripper 114 to receive the first enriched DME gas therefrom, optionally in the high pressure gas mixture from the high pressure separator 122 via the compressor 124 and the heat exchanger 180. The DME absorber is operatively fluidly coupled to the oil stripper 116 to receive the second enriched DME gas therefrom, optionally in the high pressure gas mixture from the high pressure separator 122 via the compressor 124 and the heat exchanger 180.

The high pressure gas mixture may be provided from the high pressure separator 122 to the DME absorber 112, where the DME absorber may be operatively fluidly coupled to the high pressure separator to receive the high pressure gas mixture therefrom, for example through conduit 186. The high pressure gas mixture includes at least a portion of the first DME enriched gas, at least a portion of the second DME enriched gas, and a least a portion of the gas comprising DME and alkane hydrocarbons separated from the mixture of DME, crude oil, water or brine, and gas comprising alkane hydrocarbons in the gas-oil-water separation module 110.

The DME absorber 112 is also operatively fluidly coupled to the water source 128 to receive water or brine from the water source 128, for example through conduits 208 and 188. The water source 128 provides water or brine to the DME absorber to separate DME from the high pressure gas mixture in the DME absorber. The water provided from the water source 128 may be fresh water having a total dissolved solids ("TDS") content of less than 500 ppm, preferably less than 100 ppm, or may be brine having a TDS content of at least 500 ppm but less than 40000 ppm. The water provided by the water source 128 preferably is low in salinity (has a low TDS content, e.g. less than 500 ppm TDS) since DME is more soluble in low salinity water than in brine. The water source may be a fresh water source, for example an aquifer, a fresh water lake, or a river, or may be an aqueous brine source, for example, an ocean, a salt water lake, a brackish water source, a salt water aquifer, or brine produced from the oil-bearing formation.

If the water from the water source is an aqueous brine, the system of the present invention may include a desalination facility (not shown) in which the aqueous brine may be treated to reduce the TDS content of the aqueous brine to 500 ppm or less. The desalination facility may be operatively fluidly coupled between the water source 128 and the DMS absorber 112 and configured to desalinate an aqueous brine to a TDS content of 500 ppm or less. The desalination facility may include conventional means for desalinating an aqueous brine, for example, one or more nanofiltration units, and/or one or more reverse osmosis units, and/or one or more forward osmosis units, and/or one or more water purification ion exchange units.

The water source 128 may provide water or brine having a temperature of up to 50° C. to the DME absorber. The water or brine provided to the DME absorber may have a temperature of from 0° C. to 50° C. Preferably the water or brine provided to the DME absorber may have a temperature of from 0° C. to 20° C., and more preferably from 0° C. to 10° C., since the amount of DME separated from the high pressure gas mixture into the water or brine in the DME absorber is inversely related to the temperature of the water or brine. If the water is an aqueous brine having a TDS of from 500 ppm to 40000 ppm, the water provided to the DME absorber preferably has a temperature of from 0 to 20° C., more preferably from 0° C. to 10° C., since DME is less soluble in aqueous brine than fresh water, and more DME is absorbed in cold brine having a temperature of at most 20° C. than brine having a higher temperature.

In an embodiment of the system of the present invention, a heat exchanger 194 may be operatively fluidly coupled between the water source 128 and the DME absorber 112 to cool the water or brine from the water source prior to the water or brine entering the DME absorber. The heat exchanger 194 may be configured to cool the water or brine from the water source to a temperature of from 0° C. to 20° C., or to a temperature of from 0° C. to 15° C., or to a temperature of from 0° C. to 10° C. A gas-liquid heat exchanger 196 may also be operatively fluidly coupled between the water source 128 and the DME absorber 112 to cool the water or brine from the water source prior to the water or brine entering the DME absorber. The gas-liquid heat exchanger 196 may be operatively fluidly coupled to the means for expanding 126 to receive expanded DME lean gas therefrom, and may be configured to exchange heat between the water or brine from the water source 128 and the expanded DME lean gas from the means for expanding 126 to cool the water or brine and to heat the expanded DME lean gas. Alternatively, the system of the present invention may comprise either the heat exchanger 194 or the gas-liquid heat exchanger 196 operatively fluidly coupled between the water source 128 and the DME absorber 112 to cool the water or brine from the water source prior to the water or brine being provided to the DME absorber. In another embodiment, the system may contain neither the heat exchanger 194 nor the gas-liquid heat exchanger 196.

The DME absorber 112 is configured to contact the gas mixture comprised of the gas separated in the gas-oil-water separation module 110, the first DME enriched gas, and the second DME enriched gas—where preferably the gas mixture is the high pressure gas mixture provided from the high pressure separator 122—with the water or brine from the water source 128 to produce a DME lean gas, a DME absorber liquid hydrocarbon stream, and a DME absorber liquid aqueous stream. The DME lean gas is comprised of alkane hydrocarbons and contains less DME than the gas mixture provided to the DME absorber, the DME absorber liquid hydrocarbon stream is comprised of alkane hydrocarbons and DME, and the DME absorber liquid aqueous stream is comprised of DME and water or brine and contains more DME than the water or brine received by the DME absorber from the water source 128. The DME liquid hydrocarbon stream may be produced by contact of the water or brine with the gas mixture provided to the DME absorber, where a portion of the hydrocarbons of the gas mixture may condense into the liquid hydrocarbon stream upon contact with the water or brine, particularly if the water or brine has a temperature of 20° C. or less.

The DME absorber 112 may be configured to contact the gas mixture provided to the DME absorber and the water or brine from the water source 128 at a pressure significantly elevated with respect atmospheric pressure, in particular, at a pressure at which the compressor 124 provides the compressed stream to the high pressure separator 122 and/or at which the high pressure separator provides the high pressure gas mixture to the DME absorber. The DME absorber 112 may be configured to contact the high pressure gas mixture and the water or brine from the water source 128 at a pressure of from 1 MPa to 4 MPa, or from 2 MPa to 3.5 MPa.

Figure 2:
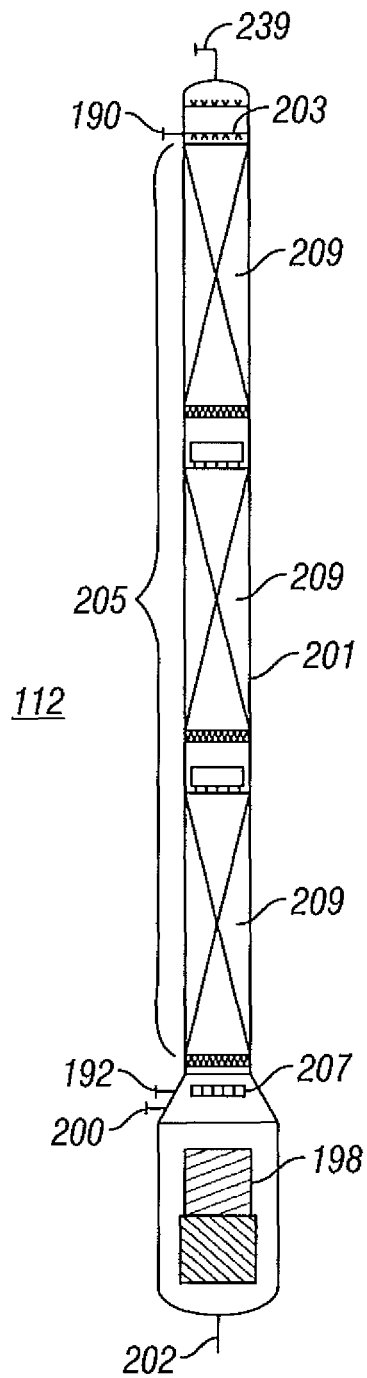
FIG. 2 is a diagram illustrating a DME absorber that may be used in the system and process of the present invention.

Referring now to FIGS. 1 and 2, in an embodiment the DME absorber 112 may be a column 201 configured so that the high pressure gas mixture and the water or brine from the water source 128 contact each other in a countercurrent flow. The DME absorber column 201 may have a water inlet 190 to receive water or brine from the water source 128, and may have a means for dispersing 203 the water or brine operatively fluidly coupled to the water inlet and located above a gas-liquid contacting zone 205, where the means for dispersing the water or brine may disperse the water or brine into the gas-liquid contacting zone in the column for contact with the gas mixture provided to the DME absorber. The means for dispersing 203 the water or brine may be one or more spray nozzles preferably disposed in the DME absorber column 201 above the gas-liquid contacting zone 205 to disperse the water over the gas-liquid contacting zone 205.

The DME absorber column 201 may have a gas mixture inlet 192 operatively fluidly coupled to the gas-oil-water separation module 110, the water stripper 114, and the oil stripper 116 to receive the gas mixture therefrom. Preferably, the gas mixture is a high pressure gas mixture, and the gas mixture inlet 192 is operatively fluidly coupled to the high pressure separator to receive the high pressure gas mixture therefrom. The DME absorber column 201 may have a manifold 207 located under the gas-liquid contacting zone 205 that is operatively fluidly coupled to the gas mixture inlet 192 to receive the gas mixture therefrom and configured to disperse the gas mixture in the column 201 under the gas-liquid contacting zone. The water or brine may flow downward in the DME absorber column 201 through the gas-liquid contacting zone 205, and the gas mixture may flow upward in the DME absorber column through the gas-liquid contacting zone 205 to effect countercurrent contact between the water or brine and the gas mixture. Upon contact of the water or brine and the gas mixture in the DME absorber column, DME is absorbed from the gas mixture by the water or brine, decreasing the DME content of the gas mixture and increasing the concentration of DME in the water or brine.

The DME absorber 112 may be configured to enhance separation of DME from the gas phase into the water or brine by promoting contact of the gas mixture with the water. In one embodiment, the DME absorber column 201 may contain packing in one or more packing beds 209 to enhance the contacting of gas mixture and the water or brine, thereby enhancing separation of DME from the gas mixture into the water or brine. The packing beds 209 may be randomly packed with metal packing rings, such as conventional Pall rings or Nutter rings. The metal packing rings in the DME absorber 112 may be 5.1 centimeter or 6.35 centimeter Nutter rings. Alternatively, if the water from the water source is brine, the packing may be plastic packing materials such as plastic packing rings, for example polypropylene or polyethylene packing rings, to inhibit corrosion of the packing materials. The DME absorber column 201 may be packed with packing materials in one or more packing beds 209 so that the DME absorber has from 6 to 20 theoretical separation stages, or from 8 to 14 theoretical separation stages, where the relative amount of DME separated from the gas mixture into the water or brine is directly related to the number of theoretical separation stages produced by the packing.

The DME lean gas produced by contacting the gas mixture with the water or brine in the gas-liquid contacting zone 205 of the DME absorber column 201 contains less DME than the gas mixture provided to the DME absorber column. For example, the gas mixture provided to the DME absorber may have a DME mole fraction of from 0.1 to 0.3, and the DME lean gas may contain at most 1000 parts per million DME, or at most 30 parts per million DME (to strip the oil to less than 1 ppm DME), or at most 1 ppm, or at least 100 parts per billion DME. The DME lean gas may be separated and removed from the DME absorber column 201 at or near the top of the column through DME lean gas outlet 239.

The DME absorber 112 may be configured to include a liquid-liquid separator 198 therein to separate the DME absorber liquid hydrocarbon stream from the DME absorber liquid aqueous stream. The liquid-liquid separator 198 in the DME absorber 112 may be located in the bottom portion of the DME absorber column 201 when the DME absorber is configured as a countercurrent flow column. Portions of the DME absorber liquid hydrocarbon stream and the DME absorber liquid aqueous stream may collect by gravity in the liquid-liquid separator portion 198 of the DME absorber column 201 after passing through the gas-liquid contacting zone 205. The DME absorber 112 may be configured to separate and remove the less dense DME absorber liquid hydrocarbon stream from the DME absorber through upper liquid-liquid separator conduit 200 and to separate and remove the more dense DME absorber liquid aqueous stream through lower liquid-liquid separator conduit 202.

Referring again to FIG. 1, the DME absorber liquid hydrocarbon stream is provided from the DME absorber 112 to the liquid-liquid extractor 118, for example through conduits 200, 204, and 206, and optionally the high pressure separator liquid hydrocarbon stream may be provided from the high pressure separator 122 to the liquid-liquid extractor, for example through conduits 204 and 206, where the liquid-liquid extractor is operatively fluidly coupled to the DME absorber 112 configured to receive the DME absorber liquid hydrocarbon stream from the DME absorber, and may be operatively fluidly coupled to the high pressure separator 122 configured to receive the high pressure separator liquid hydrocarbon stream from the high pressure separator.

Water or brine is provided from the water source 128 to the liquid-liquid extractor 118, optionally after cooling in the heat exchanger 194 and/or in the gas-liquid heat exchanger 196, where the liquid-liquid extractor is operatively fluidly coupled to the water source configured to receive the water or brine from the water source, for example through conduits 208 and 210. The water provided from the water source 128 to the LLE may be fresh water having a total dissolved solids ("TDS") content of less than 500 ppm, preferably less than 100 ppm, or may be brine having a TDS content of at least 500 ppm but less than 40000 ppm. The water provided by the water source 128 to the LLE preferably is low in salinity (has a low TDS content, e.g. less than 500 ppm TDS) since DME is more soluble in low salinity water than in brine. The water or brine provided by the water source to the LLE may have a temperature of up to 50° C., or from 0° C. to 50° C., or from 0° C. to 20° C., and more preferably from 0° C. to 10° C., since the amount of DME separated from the liquid hydrocarbons into the water or brine in the LLE is inversely related to the temperature of the water or brine.

The water source 128 providing the water or brine to the LLE may be the same water source 128 that provides water to the DME absorber 112, and the water or brine provided to the LLE may be treated for temperature reduction and/or desalination in the same manner as the water or brine provided from the water source to the DME absorber. In one embodiment, water splitter valves 252 may be used to control the flow of water or brine from the water source to the DME absorber 112 and the LLE 118, respectively.

The liquid-liquid extractor 118 is configured to contact the DME absorber liquid hydrocarbon stream, and optionally the high pressure separator liquid hydrocarbon stream, with water or brine from the water source 128 to produce a liquid-liquid extractor (LLE) liquid hydrocarbon stream and a LLE liquid aqueous stream. In a preferred embodiment, the LLE is configured to contact the water or brine with the liquid hydrocarbons from the DME absorber liquid hydrocarbon stream and the high pressure separator liquid hydrocarbon stream such that the water is the dispersed phase. The LLE hydrocarbon stream is comprised of alkane hydrocarbons and contains less DME than the DME absorber liquid hydrocarbon stream provided to the LLE 118 and, optionally, less DME than the high pressure separator liquid hydrocarbon stream provided to the LLE. The LLE liquid aqueous stream is comprised of DME and water and contains more DME than the water or brine provided to the LLE 118.

Figure 3:
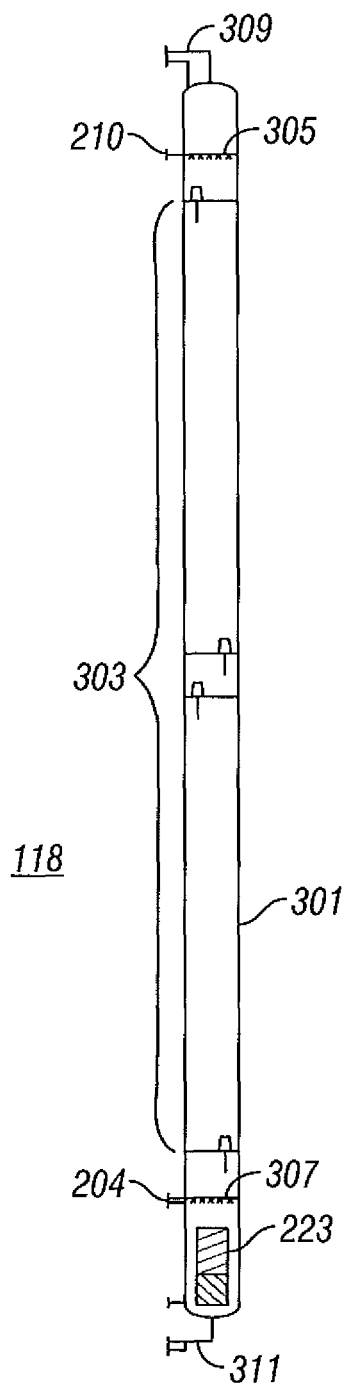
FIG. 3 is a diagram illustrating a liquid-liquid extractor that may be used in the system and process of the present invention.

Referring now to FIGS. 1 and 3, the LLE 118 may be a column 301 configured so that the DME absorber liquid hydrocarbon stream, and optionally the high pressure separator liquid hydrocarbon stream, contacts the water or brine from the water source 128 in a countercurrent flow. The LLE column 301 may have a water inlet 210 operatively fluidly coupled to the water source to receive water or brine from the water source 128, and may have a means for dispersing 305 the water or brine operatively fluidly coupled to the water inlet and located above a liquid-liquid contacting zone 303 in the LLE column, where the means for dispersing the water or brine may disperse the water or brine into the liquid-liquid contacting zone in the column for contact with the DME absorber liquid hydrocarbon stream and the high pressure separator liquid hydrocarbon stream provided to the LLE.

The LLE column 301 may have a liquid hydrocarbon inlet conduit 204 operatively fluidly coupled to the DME absorber 112 to receive the DME absorber liquid hydrocarbon stream therefrom, and optionally operatively fluidly coupled to the high pressure separator 122 to receive the high pressure separator liquid hydrocarbon stream therefrom. The LLE column 301 may have a means for dispersing 307 the DME absorber liquid hydrocarbon stream and the high pressure separator liquid hydrocarbon stream operatively fluidly coupled to the liquid hydrocarbon inlet conduit 204 and located below the liquid-liquid contacting zone 303 in the LLE column. The means for dispersing may be a conventional mechanism for dispersing fluid into a fluid stream, for example a tube or a pipe with nozzle outlets along the length of the tube or pipe. The means for dispersing 307 the DME absorber liquid hydrocarbon stream and the high pressure separator liquid hydrocarbon stream may disperse the DME absorber liquid hydrocarbon stream and the high pressure separator liquid hydrocarbon stream into the liquid-liquid contacting zone 303 in the LLE column 301 for contact with the water or brine provided to the LLE 118.

Contact between the water or brine and the DME absorber liquid hydrocarbon stream and the high pressure separator liquid hydrocarbon stream may be affected countercurrently in the LLE column 301. The water or brine may flow downward in the LLE column 301 through the liquid-liquid contacting zone 303 and the DME absorber liquid hydrocarbon stream and the high pressure separator liquid hydrocarbon stream may flow upwards in the LLE column through the liquid-liquid contacting zone 303 to effect contact between the water or brine and the DME absorber liquid hydrocarbon stream and the high pressure separator liquid hydrocarbon stream.

The liquid-liquid extractor 118 may be configured to enhance separation of DME from the DME absorber liquid hydrocarbon stream, and optionally from the high pressure separator liquid hydrocarbon stream, by promoting contact of the DME absorber liquid hydrocarbon stream and the high pressure separator liquid hydrocarbon stream with the water or brine. In one embodiment, the LLE column 301 may contain sieve trays located within the liquid-liquid contacting zone 303 to enhance the contacting of the DME absorber liquid hydrocarbon stream and the high pressure separator liquid hydrocarbon stream with the water or brine, thereby enhancing separation of DME from the DME absorber liquid hydrocarbon stream and the high pressure separator liquid hydrocarbon stream into the water or brine. The number and configuration of the sieve trays may be selected so that the LLE 118 has from 6 to 20 theoretical separation stages, or from 8 to 14 theoretical separation stages, where the relative amount of DME separated from the DME absorber liquid hydrocarbon stream and the high pressure separator liquid hydrocarbon stream into the water or brine is directly related to the number of theoretical separation stages produced by the trays. In one embodiment, the LLE column 301 may have from 25 to 50 sieve trays with 0.635 cm holes at 45 cm spacing having a tray efficiency of 33% located within the liquid-liquid contacting zone 303. The sieve trays may be configured "upside down" within the LLE column 301 (i.e. with "upcomers") to promote dispersing the water or brine within the liquid hydrocarbons in the liquid-liquid contacting zone 303. A liquid-liquid plate separator 223 near the bottom of the LLE column 301 to assist in separation of the LLE liquid aqueous stream from the LLE liquid hydrocarbon stream.

The LLE 118 may be operated at a pressure at which the DME absorber liquid hydrocarbon stream is provided to the LLE from the DME absorber 112 or at the pressure at which the high pressure separator liquid hydrocarbon stream is provided to the LLE from the high pressure separator. In an embodiment, the LLE may be operated at a pressure of from 1 MPa to 4 MPa, or from 2 MPa to 3 MPa.

A LLE hydrocarbon stream may be produced from the LLE 118, for example through the liquid hydrocarbon outlet 309 of the LLE column 301. The LLE hydrocarbon stream produced in the LLE 118 may contain very little DME. For example the LLE hydrocarbon stream may contain less than 1 ppm by weight DME, or may contain less than 100 parts per billion DME, by weight.

Referring again to FIG. 1, the LLE hydrocarbon stream may be provided to a liquid petroleum gas storage facility 214 as liquid petroleum gas (LPG) via conduit 216. Alternatively, the LLE hydrocarbon stream may be provided to a low pressure LPG separator 218 that is operatively fluidly coupled to the LLE 118, for example via conduit 220, where the low pressure LPG separator is operated at a pressure less than the LLE 118, preferably less than 1 MPa, and more preferably at ambient pressure. An LPG liquid may be separated from an LPG gas in the low pressure LPG separator. In an embodiment, a heater or heat exchanger 221 may be operatively fluidly coupled between the LLE 118 and the low pressure LPG separator 218 to heat the LLE hydrocarbon stream to a temperature of from 30° C. to 70° C. prior to separating the LPG liquid from the LPG gas in order to facilitate separation of low molecular weight hydrocarbons from the LPG liquid, for example C1-C4 hydrocarbons. The LPG liquid may be mixed with oil from the oil stripper from which DME has been removed, for example via conduit 222. The LPG gas may be mixed with DME lean gas fed into the oil stripper 116, for example via conduits 224 and 226.

Referring now to FIG. 3, an LLE aqueous stream may be produced from the LLE 118, for example through the aqueous stream outlet 311 of the LLE column 301. The LLE liquid aqueous stream produced in the LLE 118 contains more DME than the water or brine provided to the LLE.

Referring back to FIG. 1, the LLE liquid aqueous stream may be provided from the LLE 118 to an aqueous DME storage facility 228, for example via conduits 229, 202, and 232. The high pressure separator liquid aqueous stream may also be provided to the aqueous DME storage facility, for example via conduits 234, 202, and 234, and may be mixed with the LLE liquid aqueous stream. As described in further detail below, the LLE liquid aqueous stream, and optionally the high pressure separator liquid aqueous stream, may be injected from the aqueous DME storage facility 228 into an oil-bearing formation to enhance oil recovery from the formation utilizing the DME in the LLE liquid aqueous stream and the high pressure separator liquid aqueous stream. Optionally, DME from a DME storage facility 236 may be combined with the LLE liquid aqueous stream and the high pressure separator liquid aqueous stream, for example via conduit 238, to increase the amount of DME therein for injection into the oil-bearing formation. In another embodiment, the system may include a DME distillation unit (not shown) for distilling DME from the LLE liquid aqueous stream and, optionally, the high pressure separator liquid aqueous stream, to separate DME and water.

The system of the present invention may include a means for expanding a gas 126. The means for expanding a gas 126 may be operatively fluidly coupled to the DME absorber 112, for example through conduit 239 to receive the DME lean gas from the DME absorber. The means for expanding a gas 126 is configured to expand the DME lean gas from the DME absorber 112 to produce an expanded DME lean gas, where the DME lean gas received from the DME absorber is a high pressure DME lean gas, and the expanded DME lean gas has a lower pressure than the high pressure DME lean gas received from the DME absorber. The expanded DME lean gas may have a pressure of less than 1 MPa, and may have a pressure at or near ambient pressure.

A DME lean gas splitter valve 182 may be operatively fluidly coupled between the DME absorber 112 and the means for expanding a gas 126 to control the gas recycle volume ratio of the DME lean gas produced from the DME absorber back into the system relative to the amount of the DME lean gas produced from the system. The DME lean gas splitter valve 182 may be adjusted and controlled to split the DME lean gas produced from the DME absorber 112 into a first portion for production as natural gas that may be provided to a natural gas pipeline or a natural gas storage facility 184 and into a second portion for recycle through the system as a DME lean gas stream for stripping DME from the aqueous and oil phases separated from the mixture of DME, oil, water, and gas in the gas-oil-water separation module 110. The DME lean gas splitter valve 182 may be adjusted and controlled to maintain the gas recycle volume ratio between 35:65 to 95:5 of recycled DME lean gas to produced DME lean gas (from 35 vol. % to 95 vol. % of the DME lean gas produced by the DME absorber is recycled for stripping DME from the aqueous and oil phases in the water and oil strippers). Increasing the gas recycle volume ratio may decrease the DME content in oil produced from the system, and may decrease the DME content in water produced from the water stripper in the system, while increasing the DME content in water produced from the DME absorber. Decreasing the gas recycle volume ratio may decrease the DME produced in the DME lean gas. The DME lean gas splitter valve 182 may be adjusted and controlled to obtain the desired gas recycle volume ratio to assist in producing the oil, and/or the natural gas, and/or the produced water having a selected quantity of DME therein. The DME lean gas splitter valve may be operatively automatically controlled by a feedback loop that may measure the DME content of oil produced by the system, or the DME content of gas produced by the system, or the DME content of water produced by the system and automatically adjust the DME lean gas splitter valve to maintain the DME content of the measured oil, water, or gas within a selected range.

The means for expanding a gas 126, operatively fluidly coupled to the DME absorber 112 and optionally operatively fluidly coupled to the DME lean gas splitter valve 182, may be any conventional apparatus for expanding a gas. In one embodiment, the means for expanding a gas 126 may be a conventional expander that recovers energy from the expansion of the gas. In another embodiment, the means for expanding a gas 126 may be a Joule-Thomson expansion valve.

The DME lean gas may be expanded by the means for expanding a gas 126. The DME lean gas entering the means for expanding a gas 126 may be a high pressure DME lean gas having a pressure of greater than 1 MPa, or from greater than 1 MPa to 4 MPa, or from 2 MPa to 3 MPa, and, upon expansion, the DME lean gas may be an expanded DME lean gas having a pressure of up to 1 MPa, or from 0.101 MPa to 1 MPa, and preferably having a pressure of atmospheric pressure.

The means for expanding a gas 126 may be operatively fluidly coupled to the water stripper 114 to provide a portion of the expanded DME lean gas to the water stripper, for example through conduits 242, 246, 248, and 250. The means for expanding a gas 126 may also be operatively fluidly coupled to the oil stripper 116, for example through conduits 242, 246, 248, and 226 to provide a portion of the expanded DME lean gas to the oil stripper.

The system of the present invention may also include an adjustable gas splitter component 240 operatively fluidly coupled to the means for expanding a gas 126, the water stripper 114, and the oil stripper 116. The adjustable gas splitter component 240 is configured to receive the expanded DME lean gas from the means for expanding a gas 126 and to split the expanded DME lean gas into a first portion and a second portion, and to provide the first portion of the expanded DME lean gas to the water stripper 114, for example through conduit 250, and to provide the second portion of the expanded DME lean gas to the oil stripper 116, for example through conduit 226. The expanded DME lean gas adjustable gas splitter component 240 may be configured to be adjusted to adjust the amount of the expanded DME lean gas split into the first portion of the expanded DME lean gas and into the second portion of the expanded DME lean gas so that the amount of DME stripped from the oil phase in the oil stripper 116 and the amount of DME stripped from the aqueous phase in the water stripper 114 may be optimized to strip DME from the oil in the oil stripper and/or to strip DME from the water in the water stripper.

In one embodiment, the expanded DME lean gas adjustable gas splitter component 240 may be comprised of adjustable valves that may be adjusted to select the amount of the portions of the expanded DME lean gas provided to the water stripper 114 and to the oil stripper 116. The amount of the expanded DME lean gas that may be provided as a first portion to the water stripper 114 and as a second portion to the oil stripper 116 may be selected based on the relative volume of the oil phase to the aqueous phase separated from the mixture of DME, oil, water, and gas in the gas separation module 110, where the volume of the first portion of the expanded DME lean gas provided to the water stripper and the volume of the second portion of the expanded DME lean gas provided to the oil stripper may be directly related to the ratio of the volume of the aqueous phase provided to the water stripper to the volume of the oil phase provided to the oil stripper. In an embodiment, from 1 vol. % to 80 vol. % of the expanded DME lean gas provided from the means for expanding a gas 126 to the adjustable gas splitter component 240 may be provided in the second portion of expanded DME lean gas to the oil stripper 116, and from 20 vol. % to 99 vol. % may be provided in the first portion of expanded DME lean gas to the water stripper 114. In one embodiment, the adjustable valves of the adjustable gas splitter component 240 may be automatically controlled via a feedback loop, for example monitored and controlled by a computer, to maintain a selected ratio of the first portion of the expanded DME lean gas to the second portion of the expanded DME lean gas.

As described above, the gas-liquid heat exchanger 196 may be operatively fluidly coupled to the means for expanding 126 to receive expanded DME lean gas therefrom, and may be configured to exchange heat between the water or brine from the water source 128 and the expanded DME lean gas from the means for expanding 126 to cool the water or brine and to heat the expanded DME lean gas. Further, as described above, the heat exchanger 180 may be operatively fluidly coupled to the means for expanding to receive expanded DME lean gas therefrom, and may be configured to exchange heat between the compressed stream and the expanded DME lean gas to cool the compressed stream and to heat the expanded DME lean gas. The means for expanding 126 may be operatively fluidly coupled to both the gas-liquid heat exchanger 186 and the heat exchanger 180—in series or in parallel, or may be operatively fluidly coupled to only one of the gas-liquid heat exchanger 186 or the heat exchanger 180, or may be coupled to neither. The adjustable gas splitter component 240, if present, the water stripper 114 and the oil stripper 116 may be operatively fluidly coupled to the gas-liquid heat exchanger 196 and/or the heat exchanger 180 to receive the heated expanded DME lean gas from the gas-liquid heat exchanger 196 and/or the heat exchanger 180. Heating the expanded DME lean gas in the gas-liquid heat exchanger 196 and/or the heat exchanger 180 may increase the amount of DME separated from the aqueous phase in the water stripper 114 and the amount of DME separated from the oil phase in the oil stripper 116 by raising the temperature at which the aqueous phase and the oil phase are contacted with the expanded DME lean gas, which may increase the quantity of DME vaporized by contact of the expanded DME lean gas with the aqueous phase and the oil phase.

The water stripper 114 is operatively fluidly coupled to the gas-oil-water separation module 110 configured to receive the liquid aqueous phase separated from the mixture in the gas-oil-water separation module, for example through conduit 140. In one embodiment, a water heating element 254 may be operatively fluidly coupled between the oil-water-gas separation module 110 and the water stripper 114 configured to receive the liquid aqueous phase separated in the oil-water-gas separation module from the oil-water-gas separation module, to heat the liquid aqueous phase, and to provide the heated liquid aqueous phase to the water stripper. Heating the liquid aqueous phase may improve separation of DME from the liquid aqueous stream into the DME lean gas in the water stripper since DME is significantly more volatile than water. The water heating element 154 may heat the liquid aqueous phase received therein to a temperature of from 10° C. to 90° C., and, more preferably, to a temperature of from 25° C. to 60° C.

In another embodiment, a water heating element 255 may be operatively fluidly coupled between the high pressure separation unit 134 and the low pressure separation unit 135 in the gas-oil-water separation module 110 to heat the substantially degassed mixture of liquid aqueous phase and liquid oil phase from the high pressure separation unit to a temperature of from 10° C. to 90° C., or from 25° C. to 60° C. prior to being provided to the low pressure separation unit 135 for separation of the liquid aqueous phase and the liquid oil phase. Heating the degassed mixture of the liquid aqueous phase and the liquid oil phase prior to separation facilitates separation of the liquid aqueous phase and the liquid oil phase as well as heats the liquid aqueous phase to facilitate separation of DME from the liquid aqueous phase in the water stripper 114 and heats the liquid oil phase to facilitate separation of DME from the liquid oil phase in the oil stripper 116, and further separates gas from the liquid aqueous phase and liquid oil phase for processing in the DME absorber 112.

The water stripper is also operatively fluidly coupled to the DME absorber 112 to receive a first portion of the DME lean gas therefrom, for example through conduits 239, 242, 246, 248, and 250. Optionally, the water stripper is operatively fluidly coupled to the DME lean gas splitter valve 182, the means for expanding a gas 126, and the adjustable gas splitter component 240 through which a portion of the DME lean gas produced by the DME absorber 112 may be delivered to the water stripper 114.

The water stripper 114 is configured to contact the liquid aqueous phase received therein with the DME lean gas received therein to produce a DME lean water or brine containing less DME than the liquid aqueous phase received therein and to produce the first DME enriched gas, where the first DME enriched gas contains more DME than the DME lean gas received therein. The water stripper 114 is configured to contact the DME lean gas received therein with the liquid aqueous phase received therein at a pressure of from atmospheric pressure up to 1 MPa, preferably from atmospheric pressure up to the pressure of the DME lean gas provided to the water stripper. The water stripper is further configured to contact the portion of the DME lean gas received therein with the liquid aqueous phase received therein at a temperature of from 0° C. to 90° C., more preferably from 25° C. to 60° C., where the temperature at which the liquid aqueous phase and the DME lean gas are contacted in the water stripper may be the temperature of the liquid aqueous phase provided to the water stripper.

Figure 4:
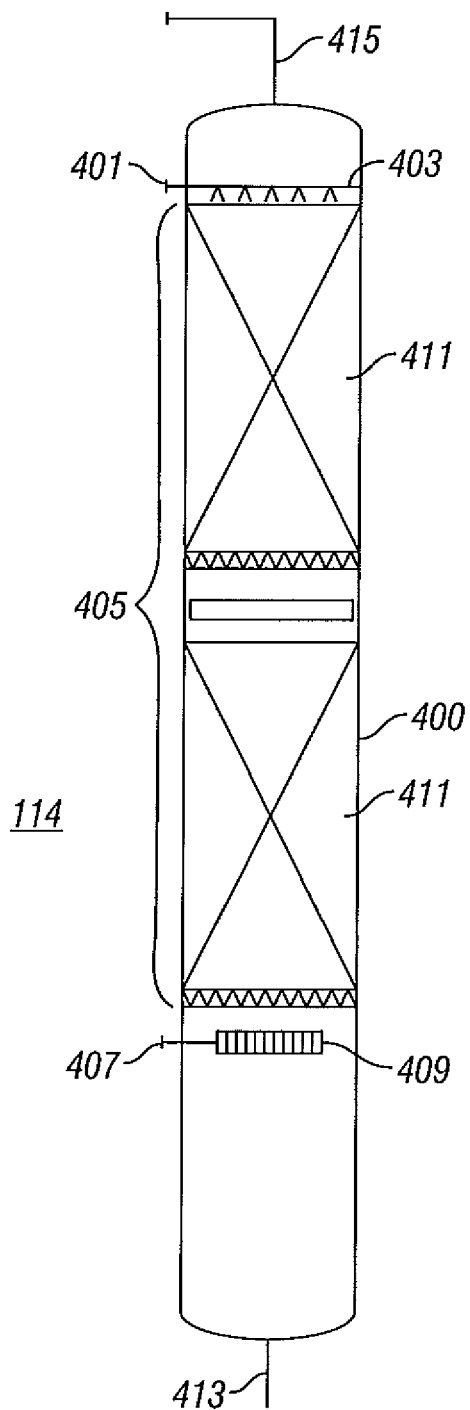
FIG. 4 is a diagram of a water stripper that may be used in the system and process of the present invention.

The water stripper 114 may be configured to enhance separation of DME from the separated liquid aqueous phase received therein into the DME lean gas to produce the first DME enriched gas and the DME lean water or brine. As shown in FIGS. 1 and 4, the water stripper 114 may be a column 400 configured so that the separated liquid aqueous phase and the DME lean gas are contacted in a countercurrent flow. The water stripper column 400 may have a water inlet 401 to receive the liquid aqueous phase from the gas-oil-water separation module 110 or optionally from the water heating element 254. The water stripper column 400 also may have means for dispersing 403 the liquid aqueous phase operatively fluidly coupled to the water inlet 401 and located above a gas-liquid contacting zone 405, where the means for dispersing the liquid aqueous phase may disperse the liquid aqueous phase into the gas-liquid contacting zone 405 in the column for contact with the DME lean gas provided to the water stripper 114. The means for dispersing 403 the liquid aqueous phase may be one or more spray nozzles preferably disposed in the water stripper column 400 above the gas-liquid contacting zone 405 to disperse the separated liquid aqueous phase over the gas-liquid contacting zone.

The water stripper 114 may have a DME lean gas inlet 407 operatively fluidly coupled to the DME absorber 112 for receiving the DME lean gas therefrom. Preferably the water stripper 114 is operatively fluidly coupled to the DME lean gas splitter valve 182, the means for expanding a gas 126, and the adjustable gas splitter component 240 through which the DME lean gas is provided to the water stripper from the DME absorber 112. The water stripper 114 may have a manifold 409 located under the gas-liquid contacting zone 405 that is operatively fluidly coupled to the DME lean gas inlet 407 to receive the DME lean gas therefrom and configured to disperse the DME lean gas in the column 400 under the gas-liquid contacting zone. The liquid aqueous phase provided to the water stripper may flow downward in the water stripper column 400 through the gas-liquid contacting zone 405, and the DME lean gas may flow upward in the water stripper column through the gas-liquid contacting zone to affect countercurrent contact between the liquid aqueous phase and the DME lean gas. Upon contact of the liquid aqueous phase and the DME lean gas in the water stripper column 400, DME is absorbed from the liquid aqueous phase by the DME lean gas, decreasing the DME content of the liquid aqueous phase and increasing the DME content of the DME lean gas.

The water stripper 114 may be configured to enhance separation of the DME from the aqueous liquid phase into the DME lean gas by promoting contact of the liquid aqueous phase with the DME lean gas. In one embodiment, the water stripper 114 may contain packing in one or more packing beds 411 to enhance contacting of the liquid aqueous phase and the DME lean gas, thereby enhancing separation of DME from the liquid aqueous phase into the DME lean gas. The packing beds may be packed with plastic packing materials such as plastic packing rings, for example, polypropylene or polyethylene packing rings. The plastic packing rings may be 5.1 cm or 6.35 cm Nutter rings. The water stripper column 400 may be packed with one or more of the packing beds 411 so that the water stripper 114 has from 6 to 15 theoretical separation stages, where the relative amount of DME separated from the liquid aqueous phase into the DME lean gas is directly related to the number of theoretical separation stages produced by the packing.

The water stripper may be configured with a DME lean water outlet 413 for removing the DME lean water or brine produced by contacting the liquid aqueous phase with the DME lean gas in the water stripper. The DME lean water or brine produced by the water stripper 114 has significantly less DME than the liquid aqueous phase provided to the water stripper. The DME lean water or brine produced by the water stripper may have a DME content of less than 100 ppmwt. Referring to FIG. 1, the DME lean water or brine may be provided to a water storage facility 256, for example through conduit 258. The DME lean water or brine may also be injected into an oil-bearing formation to enhance recovery of oil from the oil-bearing formation.

Referring again to FIG. 4, the water stripper column 400 may be configured with a first DME enriched gas outlet 415 for removing the first DME enriched gas from the water stripper. The first DME enriched gas contains significantly more DME than the portion of the DME lean gas provided to the water stripper. Referring back to FIG. 1, as described above, the water stripper 114 is operatively fluidly coupled to the DME absorber 112, and is optionally operatively fluidly coupled to the compressor 124 and the high pressure separator 122, to provide the first DME enriched gas to the DME absorber.

Still referring to FIG. 1, the oil stripper 116 is operatively fluidly coupled to the gas-oil-water separation module 110 configured to receive the liquid oil phase separated from the mixture in the gas-oil-water separation module, for example through conduit 142. In one embodiment, an oil heating element 260 may be operatively fluidly coupled between the oil-water-gas separation module 110 and the oil stripper 116 configured to receive the liquid oil phase separated in the oil-water-gas separation module therefrom, to heat the liquid oil phase, and to provide the heated liquid oil phase to the oil stripper. Heating the liquid oil phase may improve separation of DME from the liquid oil into the DME lean gas in the oil stripper since DME is significantly more volatile than most components of oil. The oil heating element 160 may heat the liquid oil phase received therein to a temperature of from 10° C. to 100° C., and, more preferably, to a temperature of from 30° C. to 80° C.

The oil heating element 260 may be any conventional heater effective for heating a liquid stream from a temperature of from 0° C. up to 100° C., or up to 60° C. The oil heating element 260 may be an electrical heater. The oil heating element may be a liquid-liquid heat exchanger or a gas-liquid heat exchanger. In an embodiment (not shown) the oil heating element 260 may be a heat exchanger operatively fluidly coupled to the gas-oil-water separation module 110 to receive the separated liquid oil phase therefrom, and operatively fluidly coupled to the compressor 124 to receive the compressed stream therefrom. The heat exchanger may be configured to exchange heat between the liquid oil phase and the compressed stream to heat the liquid oil phase and to cool the compressed stream. The heated liquid oil phase may be provided to the oil stripper as described above. The oil heating element 260 heat exchanger may be operatively coupled to the heat exchanger 180 to provide the cooled compressed stream thereto, or, alternatively, may be operatively fluidly coupled to the high pressure separator 122 to provide the cooled compressed stream thereto.

The oil stripper 116 is also operatively fluidly coupled to the DME absorber 112 to receive a second portion of the DME lean gas therefrom, for example through conduits 239, 242, 246, 248, and 226. Optionally, the oil stripper is operatively fluidly coupled to the DME lean gas splitter valve 182, the means for expanding a gas 126, and the adjustable gas splitter component 240 through which a portion of the DME lean gas produced by the DME absorber 112 may be delivered to the oil stripper 116.

The oil stripper 116 is configured to contact the liquid oil phase received therein with the DME lean gas received therein to produce an oil containing less DME than the liquid oil phase received therein and to produce the second DME enriched gas, where the second DME enriched gas contains more DME than the DME lean gas received therein. The oil stripper 116 is configured to contact the DME lean gas received therein with the liquid oil phase received therein at a pressure of from atmospheric pressure up to 1 MPa, preferably from atmospheric pressure up to the pressure of the DME lean gas provided to the oil stripper. The oil stripper 116 is further configured to contact the portion of the DME lean gas received therein with the liquid oil phase received therein at a temperature of from 0° C. to 100° C., more preferably from 30° C. to 80° C., where the temperature at which the liquid oil phase and the DME lean gas are contacted in the oil stripper may be the temperature of the liquid oil phase provided to the oil stripper.

Figure 5:
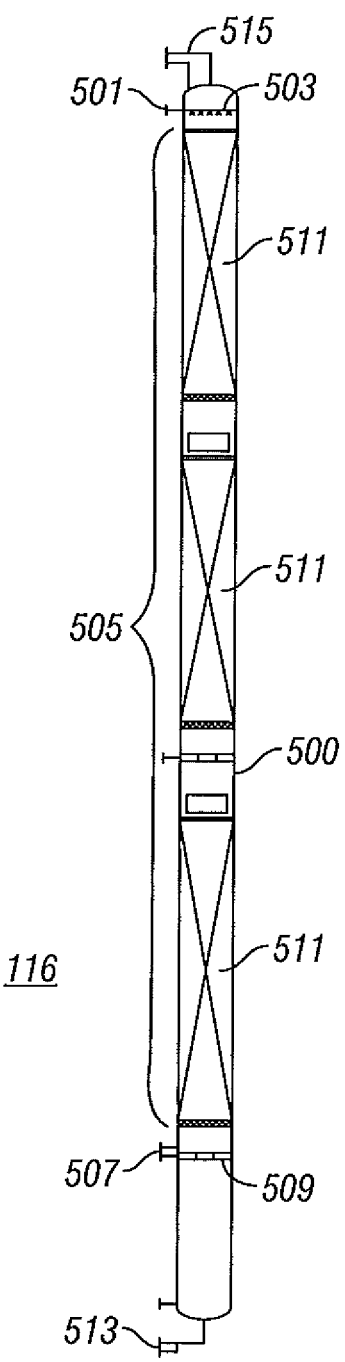
FIG. 5 is a diagram of an oil stripper that may be used in the system and process of the present invention.

The oil stripper 116 may be configured to enhance separation of DME from the separated liquid oil phase received therein into the DME lean gas to produce the second DME enriched gas and the DME lean oil containing less DME than the liquid oil phase received in the oil stripper. As shown in FIGS. 1 and 5, the oil stripper 116 may be a column 500 configured so that the separated liquid oil phase and the DME lean gas are contacted in a countercurrent flow. The oil stripper column 500 may have an oil inlet 501 to receive the liquid oil phase from the gas-oil-water separation module 110 or optionally from the oil heating element 260. The oil stripper column 500 also may have means for dispersing 503 the liquid oil phase operatively fluidly coupled to the oil inlet 501 and located above a gas-liquid contacting zone 505, where the means for dispersing the liquid oil phase may disperse the liquid oil phase into the gas-liquid contacting zone 505 in the column for contact with the DME lean gas provided to the oil stripper 116. The means for dispersing 503 the liquid oil phase may be one or more spray nozzles preferably disposed in the oil stripper column 500 above the gas-liquid contacting zone 505 to disperse the separated liquid oil phase over the gas-liquid contacting zone.

The oil stripper 116 may have a DME lean gas inlet 507 operatively fluidly coupled to the DME absorber 112 for receiving the DME lean gas therefrom. Preferably the oil stripper 116 is operatively fluidly coupled to the DME lean gas splitter valve 182, the means for expanding a gas 126, and the adjustable gas splitter component 240 through which the DME lean gas is provided to the oil stripper from the DME absorber 112. The oil stripper 116 may have a manifold 509 located under the gas-liquid contacting zone 505 that is operatively fluidly coupled to the DME lean gas inlet 507 to receive the DME lean gas therefrom and configured to disperse the DME lean gas in the column 500 under the gas-liquid contacting zone. The liquid oil phase provided to the oil stripper 116 may flow downward in the oil stripper column 500 through the gas-liquid contacting zone 505, and the DME lean gas may flow upward in the oil stripper column through the gas-liquid contacting zone to affect countercurrent contact between the liquid oil phase and the DME lean gas. Upon contact of the liquid oil phase and the DME lean gas in the oil stripper column 500, DME is absorbed from the liquid oil phase by the DME lean gas, decreasing the DME content of the liquid oil phase and increasing the DME content of the DME lean gas.

The oil stripper 116 may be configured to enhance separation of the DME from the liquid oil phase into the DME lean gas by promoting contact of the liquid oil phase with the DME lean gas. In one embodiment, the oil stripper 116 may contain packing in one or more packing beds 511 to enhance contacting of the liquid oil phase and the DME lean gas, thereby enhancing separation of DME from the liquid oil phase into the DME lean gas. The packing beds may be randomly packed with metal packing materials such as metal packing rings. The metal packing rings may be 5.1 cm or 6.35 cm Nutter rings. The oil stripper column 500 may be randomly packed with packing materials packed in one or more of the packing beds 511 so that the oil stripper 116 has from 6 to 20 theoretical separation stages, where the relative amount of DME separated from the liquid oil phase into the DME lean gas is directly related to the number of theoretical separation stages produced by the packing.

The oil stripper 116 may be configured with an oil outlet 513 for removing oil produced by contacting the liquid oil phase with the DME lean gas in the oil stripper. The oil produced by the oil stripper 116 has significantly less DME than the liquid oil phase provided to the oil stripper. The DME lean oil produced by the oil stripper 116 may have a DME content of less than 1 ppmwt or less than 100 ppbwt. Referring to FIG. 1, the DME lean oil may be provided to a storage facility 262, for example through conduit 264. In an embodiment, a degasser 263 may be operatively fluidly coupled between the oil stripper 116 and the storage facility 262 to degas the DME lean oil prior to storage. Optionally, as described above, liquid petroleum gas produced by the LLE may be combined with the DME lean oil, for example through conduits 220 and 222 and low pressure LPG separator. The produced oil may be transported to a refinery for refining into various petroleum products including transportation fuels and chemicals.

Referring again to FIGS. 1 and 5, the oil stripper column 500 may be configured with a second DME enriched gas outlet 515 for removing the second DME enriched gas from the oil stripper 116. The second DME enriched gas contains significantly more DME than the portion of the DME lean gas provided to the oil stripper. As described above, the oil stripper 116 is operatively fluidly coupled to the DME absorber 112, and is optionally operatively fluidly coupled to the compressor 124 and the high pressure separator 122, to provide the second DME enriched gas to the DME absorber.

Figure 6:
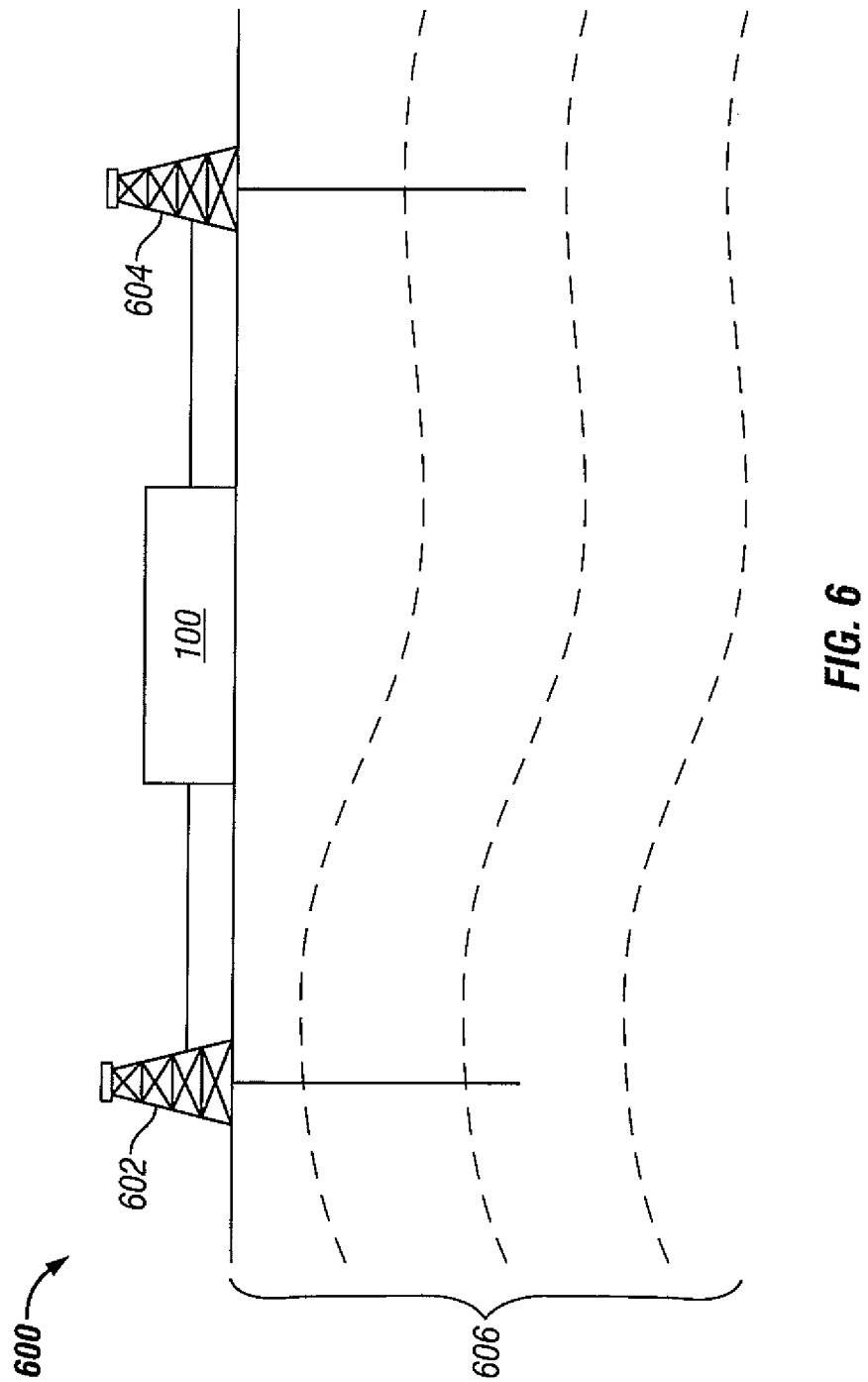
FIG. 6 is a diagram of a system including oil wells and an oil-bearing formation in accordance with an embodiment of the system of the present invention that may be used in the process of the present invention.

Referring now to FIGS. 1 and 6, an embodiment of a system 600 of the present invention is shown including a first well 602 extending into an oil-bearing formation 606, where the first well 602 is configured to produce a mixture of DME, oil, water and gas from the formation. The first well 602 may be operatively fluidly coupled to the system 100 described above, for example to the gas-oil-water separation module 110, to provide the produced mixture of DME, oil, water, and gas to the system 100 for separation of DME from the produced oil, the produced water, and the produced gas of the mixture. The system 600 may be configured to produce oil having a DME content of less than 1 ppmwt, or less than 100 ppbwt from the mixture produced by the first well 602. The system 600 also may be configured to produce a DME-water mixture, e.g. from the LLE. The system 600 may include a second well 604 extending into the oil-bearing formation 606, where the second well is configured to inject an enhanced oil recovery formulation comprising DME into the oil-bearing formation. The system 600 may be configured to provide the DME-water mixture produced therein to the second well 604 for injection into the oil-bearing formation 606 to enhance oil recovery from the oil-bearing formation.

Figure 7:
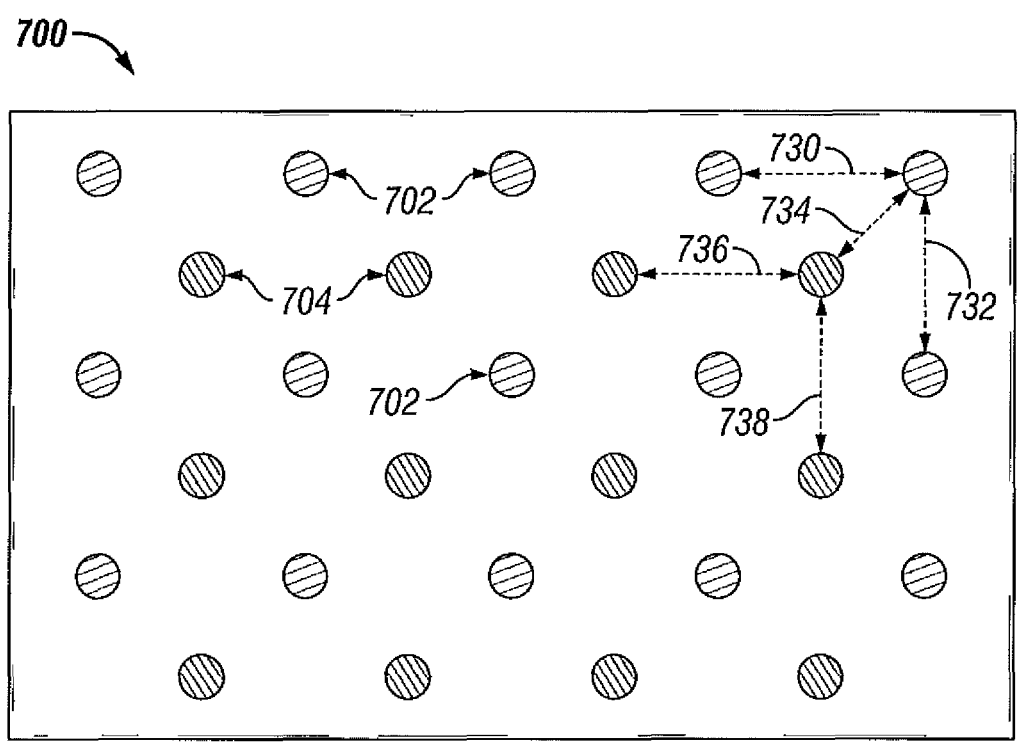
FIG. 7 is a diagram of an array of wells that may be used in the system and the process of the present invention.

Referring now to FIG. 7 an array of wells 700 is illustrated. Array 700 includes a first well group 702 and a second well group 704. In some embodiments of the system of the present invention, the first well 602 of the system 600 described above may include multiple first wells depicted as the first well group 702 in the array 700, and the second well 604 of the system 600 described above may include multiple second wells depicted as the second well group 704 in the array 700.

Each well in the first well group 702 may be a distance 730 from an adjacent well in the first well group 702. The distance 730 may be from about 5 to about 5000 meters, or from about 7 to about 1000 meters, or from about 10 to about 500 meters, or from about 20 to about 250 meters, or from about 30 to about 200 meters, or from about 50 to about 150 meters, or from about 90 to about 120 meters, or about 100 meters. Each well in the first well group 702 may be a distance 732 from an adjacent well in the first well group 702. The distance 732 may be from about 5 to about 5000 meters, or from about 7 to about 1000 meters, or from about 10 to about 500 meters, or from about 20 to about 250 meters, or from about 30 to about 200 meters, or from about 50 to about 150 meters, or from about 90 to about 120 meters, or about 100 meters.

Each well in the second well group 704 may be a distance 736 from an adjacent well in the second well group 704. The distance 736 may be from about 5 to about 5000 meters, or from about 7 to about 1000 meters, or from about 10 to about 500 meters, or from about 20 to about 250 meters, or from about 30 to about 200 meters, or from about 50 to about 150 meters, or from about 90 to about 120 meters, or about 100 meters. Each well in the second well group 704 may be a distance 738 from an adjacent well in the second well group 704. The distance 738 may be from about 5 to about 5000 meters, or from about 7 to about 1000 meters, or from about 10 to about 500 meters, or from about 20 to about 250 meters, or from about 30 to about 200 meters, or from about 50 to about 150 meters, or from about 90 to about 120 meters, or about 100 meters.

Each well in the first well group 702 may be a distance 734 from the adjacent wells in the second well group 704. Each well in the second well group 704 may be a distance 734 from the adjacent wells in first well group 702. The distance 734 may be from about 5 to about 5000 meters, or from about 7 to about 1000 meters, or from about 10 to about 500 meters, or from about 20 to about 250 meters, or from about 30 to about 200 meters, or from about 50 to about 150 meters, or from about 90 to about 120 meters, or about 100 meters. Each well in the first well group 702 may be surrounded by four wells in the second well group 704. Each well in the second well group 704 may be surrounded by four wells in the first well group 702.

In some embodiments, the array of wells 700 may have from about 10 to about 1000 wells, for example from about 5 to about 500 wells in the first well group 702, and from about 5 to about 500 wells in the second well group 704.

In some embodiments, the array of wells 700 may be seen as a top view with first well group 702 and the second well group 704 being vertical wells spaced on a piece of land. In some embodiments, the array of wells 700 may be seen as a cross-sectional side view of the formation with the first well group 702 and the second well group 704 being horizontal portions of wells spaced within the formation.

In another aspect, the present invention is directed to a process for separating DME from a mixture of DME, crude oil, water or brine, and a gas comprised of alkane hydrocarbons. A mixture comprised of DME, crude oil, water or brine, and a gas comprised of alkane hydrocarbons is provided. The mixture may be provided from an oil-bearing formation, where the mixture may be produced from the oil-bearing formation by a first well that extends into the oil-bearing formation. In a preferred embodiment, an enhanced oil recovery formulation comprising DME is injected into the oil-bearing formation by a second well that extends into the formation to enhance recovery of oil from the formation. The mixture produced by the first well may comprise DME injected into the formation through the second well, and the DME may be recovered and recycled for reinjection into the second well for further oil recovery utilizing the process of the present invention. In the liquid phase, the mixture may contain from 10 to 50 wt % crude oil, from 10 to 90 mol % water or brine, from 0.0001 to 20 wt. % DME. The mixture may have a temperature of from 0° C. to 100° C., or from 0° C. to 50° C., or from 0° C. to 20° C., and may have a pressure of from 0.1 MPa up to 1 MPa.

The mixture is separated into a gas comprised of DME and alkane hydrocarbons, an oil phase comprised of DME and crude oil, and an aqueous phase comprised of DME and water or brine. The mixture may be separated by separating the gas phase of the mixture from the liquid phase of the mixture at the temperature and pressure the mixture is provided for separation to provide the gas comprised of DME and alkane hydrocarbons, and separating the liquid oil phase and the liquid aqueous phase by phase separation to provide the aqueous phase comprised of DME and water or brine and the oil phase comprised of DME and crude oil. The separations may be effected in conventional phase separation vessels, for example, as shown in FIG. 1, the gas phase may be separated from the liquid phase in the high pressure separation unit 134, and the liquid aqueous phase may be separated from the liquid oil phase in the low pressure separation unit 135 of the gas-oil-water separation module 110. Alternatively, the gas, aqueous phase, and oil phase may be separated from each other in a single 3-phase knockout vessel.

At least a portion of the gas comprised of DME and alkane hydrocarbons separated from the mixture may then be compressed along with at least a portion of a first DME enriched gas, produced as described below, and at least a portion of a second DME enriched gas, produced as described below, to produce a compressed stream having increased pressure relative to the gas separated from the mixture and relative to the first and second DME enriched gases. The gaseous mixture of the gas comprised of DME and alkane hydrocarbons separated from the mixture and the first and second DME enriched gases may be compressed from a pressure of from 0.1 MPa-1 MPa to a pressure of greater than 1 MPa to 4 MPa, or from 2 MPa to 3 MPa. The gas comprised of DME and alkane hydrocarbons and the first and second DME enriched gases may be compressed utilizing a conventional compressor, for example a 3-stage compressor 124 as shown in FIG. 1 or a 2-stage compressor. A portion of the DME and gas may be condensed as liquid in the initial stages of compression, for example in liquid knockouts 156, 158, and 160 in FIG. 1. The liquid condensed in the initial stages of compression may be separated from the compressed gas and added back to the mixture for separation into the liquid aqueous phase or the liquid oil phase.

After compression, the compressed stream may be cooled to aid in separation of liquid petroleum gases (LPG) from the compressed stream. The compressed stream may be cooled to a temperature of from 0° C. to 50° C., or from 0° C. to 40° C. The compressed stream may be cooled by exchanging heat with an expanded DME lean gas, produced as described below, to cool the compressed stream and to heat the expanded DME lean gas. The heat exchange between the compressed stream and the expanded DME lean gas may be affected in a gas-gas heat exchanger, for example, heat exchanger 180 as shown in FIG. 1.

The compressed stream, optionally cooled, may be separated into a high pressure gas mixture, a third liquid hydrocarbon stream comprising the LPG, and a third aqueous stream. The high pressure gas mixture may be comprised of DME and alkane hydrocarbons, and is comprised of at least a portion of the gas comprising DME and alkane hydrocarbons separated from the mixture of DME, crude oil, water, and gas, and may be comprised of at least a portion of the first DME enriched gas and at least a portion of the second DME enriched gas. The third liquid hydrocarbon stream may be comprised of DME and alkane hydrocarbons, and the third aqueous stream may be comprised of DME and water or brine. The separation of the compressed stream into its components may be effected at a pressure of from 1 MPa to 4 MPa, preferably from 2 MPa to 3 MPa, and at a temperature of from 0° C. to 100° C., preferably at a temperature of from 0° C. to 50° C. The separation of the compressed stream into the high pressure gas mixture, the third liquid hydrocarbon stream, and the third aqueous stream may be effected in a conventional high pressure separator, for example the high pressure separator 122 as shown in FIG. 1.

At least a portion of the gas comprised of DME and alkane hydrocarbons, at least a portion of the first DME enriched gas, and at least a portion of the second DME enriched gas, preferably as the high pressure gas mixture, (the "DME-containing gas") is contacted with a first portion of water or brine to produce a DME lean gas comprising alkane hydrocarbons, a first aqueous stream comprising DME and water or brine, and a first liquid hydrocarbon stream comprising DME and alkane hydrocarbons. Contacting may be effected in a DME absorber 112 as described above and shown in FIG. 1. Contacting the DME-containing gas with the first portion of water or brine separates at least a portion of the DME from the DME-containing gas into the first portion of water or brine so that the DME lean gas produced by the contacting contains less DME than the DME-containing gas and the first aqueous stream contains more DME than the first portion of water or brine. Contacting the DME-containing gas with the first portion of water or brine may also condense a portion of DME and hydrocarbons from the DME-containing gas to produce the first liquid hydrocarbon stream.

As described above, the water or brine (i.e. the first portion of water or brine) contacted with the DME-containing gas may have a TDS content of less than 500 ppm, or from 500 ppm to 40000 ppm. Preferably the first portion of water contacted with the DME-containing gas is fresh water having a TDS of less than 500 ppm since DME is more soluble in fresh water than in brine. The first portion of water or brine may be provided from a water source 128 as described above and as shown in FIG. 1. Brine may be desalinated to reduce its TDS content to less than 500 ppm as described above.

The first portion of water or brine may have a temperature from 0° C. to 100° C., or from 0° C. to 50° C., or from 0° C. to 20° C., or from 0° C. to 10° C., where colder water or brine is preferred for contact with the DME-containing gas since DME is more soluble in cold water or brine than in warm water or brine. The water or brine may be cooled by contact with an expanded DME lean gas in a gas-liquid heat exchanger 196 as described above and as shown in FIG. 1.

The DME-containing gas and the first portion of water or brine may be contacted at a temperature of from 0° C. to 100° C., preferably from 0° C. to 20° C., and more preferably at a temperature of from 0° C. to 10° C. The DME-containing gas and the first portion of water or brine may be contacted at a pressure of from 1 MPa to 4 MPa, or from 2 MPa to 3 MPa, and preferably are contacted at the pressure of the high pressure gas mixture.

The contact of the DME-containing gas and the first portion of water or brine may be controlled to optimize separation of DME from the DME-containing gas into the water or brine or into the first liquid hydrocarbon stream. As described above and shown in FIG. 2, the DME-containing gas and the first portion of water or brine may be contacted in a DME absorber column 201, where the DME absorber column contains packing in one or more packing beds 209 to enhance contact of the DME-containing gas with the water or brine, thereby enhancing separation of DME from the gas phase into the water or brine. The DME absorber column may be packed with packing materials in one or more packing beds so that the DME absorber has from 6 to 20 theoretical separation stages, or from 8 to 14 theoretical separation stages, where the relative amount of DME separated from the DME-containing gas into the water or brine is directly related to the number of theoretical separation stages produced by the packing.

The concentration of DME in the oil produced by the process of the present invention may be controlled, in part, by controlling the amount of DME separated from the DME-containing gas when contacting the DME-containing gas, preferably the high pressure gas mixture, with the first portion of water or brine. A portion of the DME lean gas produced by contacting the DME-containing gas with the first portion of water or brine is utilized to strip the oil phase separated from the mixture of DME, crude oil, water, and gas. Controlling the amount of DME separated from the DME-containing gas to minimize the DME contained in the resulting DME lean gas will enhance the DME stripping effectiveness of the DME lean gas for stripping DME from the oil phase.

The DME lean gas, the first liquid hydrocarbon stream, and the first aqueous stream produced by contact of the DME-containing gas, preferably as the high pressure gas mixture, with the first portion of water or brine may be separated. The DME lean gas may be separated from the first aqueous stream and the first liquid hydrocarbon stream by separating the product gas from the liquid phases. The first liquid hydrocarbon stream product may be separated from the first aqueous stream product by phase separating the liquid hydrocarbon phase resulting from the contact from the liquid aqueous phase resulting from the contact. Preferably, as described above and as shown in FIG. 2, the DME-containing gas is contacted with the first portion of water or brine in a column 201 in a countercurrent flow with the DME-containing gas bubbling upwards through downcoming water or brine, where the DME lean gas is produced from the top of the column and the first liquid hydrocarbon stream and the first aqueous stream are produced from the bottom of the column from a liquid-liquid separator 198 located at the bottom of the column.

The first liquid hydrocarbon stream and, optionally, the third liquid hydrocarbon stream may be contacted with a second portion of water or brine to produce a second liquid hydrocarbon stream comprising alkane hydrocarbons and a second aqueous stream comprising DME and water or brine, where the second liquid hydrocarbon stream contains less DME than the first liquid hydrocarbon stream, or, optionally the combined first and third liquid hydrocarbon streams. Contacting may be effected in a liquid-liquid extractor 118 as described above and shown in FIG. 1. Contacting the first liquid hydrocarbon stream with the second portion of water or brine separates at least a portion of the DME from the first liquid hydrocarbon stream into the second portion of water or brine so that the second liquid hydrocarbon stream produced by the contacting contains less DME than the first liquid hydrocarbon stream, and the second aqueous stream contains more DME than the second portion of water or brine. If the first and third liquid hydrocarbon streams are combined and contacted with the second portion of water or brine, the second liquid hydrocarbon stream contains less DME than the combined first and third liquid hydrocarbon streams.

As described above, the water or brine (i.e. the second portion of water or brine) contacted with the first liquid hydrocarbon stream or the combined first and third liquid hydrocarbon streams may have a TDS content of less than 500 ppm, or from 500 ppm to 40000 ppm. Preferably the water contacted with the first liquid hydrocarbon stream or the combined first and third liquid hydrocarbon streams is fresh water having a TDS of less than 500 ppm since DME is more soluble in fresh water than in brine. The water may be provided from a water source 128 as described above and as shown in FIG. 1. Brine may be desalinated to reduce its TDS content to less than 500 ppm as described above.

The second portion of water or brine may have a temperature from 0° C. to 100° C., or from 0° C. to 50° C., or from 0° C. to 20° C., or from 0° C. to 10° C., where colder water or brine is preferred for contact with the first liquid hydrocarbon stream or the combined first and third liquid hydrocarbon streams since DME is more soluble in cold water or brine than in warm water or brine. The water may be cooled by contact with an expanded DME lean gas in a gas-liquid heat exchanger 196 as described above and as shown in FIG. 1.

The second portion of water may be provided from the same water source as the first portion of water used to contact the DME-containing gas, and may be treated to desalinate or cool the water in the same manner as the first portion of water from the water source. Water from the water source may be split into a first portion and a second portion, preferably after cooling and desalination, where the first portion is contacted with the DME-containing gas to separate DME from the DME-containing gas, and the second portion is contacted with the first liquid hydrocarbon stream or the combined first and third liquid hydrocarbon streams to separate DME from the first liquid hydrocarbon stream or the combined first and third liquid hydrocarbon streams.

The first liquid hydrocarbon stream, optionally together with the third liquid hydrocarbon stream, and the second portion of water or brine may be contacted at a temperature of from 0° C. to 100° C., preferably from 0° C. to 20° C., and more preferably at a temperature of from 0° C. to 10° C., and at a pressure of from 1 MPa to 4 MPa, or from 2 MPa to 3 MPa.

The contact of the first liquid hydrocarbon stream or the combined first and third liquid hydrocarbon streams and the second portion of water or brine may be controlled to optimize separation of DME from the liquid hydrocarbon stream(s) into the water or brine. As described above and shown in FIG. 3, the first liquid hydrocarbon stream or the combined first and third liquid hydrocarbon streams and the second portion of water or brine may be contacted in an LLE column 301, where the LLE column contains a plurality of sieve trays to enhance contact and DME exchange of the liquid hydrocarbon stream(s) with the second portion of water or brine, thereby enhancing separation of DME from the liquid hydrocarbon stream(s) into the water or brine.

The second liquid hydrocarbon stream and the second aqueous stream produced by contact of the first liquid hydrocarbon stream, optionally together with the third liquid hydrocarbon stream, with the second portion of water or brine may be separated. The second liquid hydrocarbon stream may be separated from the second aqueous stream by separating the less dense second liquid hydrocarbon stream as a hydrocarbon phase from the more dense second aqueous stream as an aqueous phase. Preferably, as described above and as shown in FIG. 3, the first liquid hydrocarbon stream, optionally together with the third liquid hydrocarbon stream, is contacted with the second portion of water or brine in a column 301 in a countercurrent flow with the less dense hydrocarbon stream(s) flowing upwards through downcoming water or brine, where the second liquid hydrocarbon stream is produced from the top of the column and the second aqueous stream is produced from the bottom of the column.

The second liquid hydrocarbon stream is liquid petroleum gas (LPG). The second liquid hydrocarbon stream may be stored as LPG, or may be mixed with DME-lean oil produced by the process. If a portion of the second liquid hydrocarbon stream is mixed with the DME-lean oil, the second hydrocarbon stream may be heated to a temperature of from 30° C. to 70° C. in a conventional heater or heat exchanger 221 prior to mixing and then flashed in a low pressure LPG separator 218 at a pressure of from atmospheric pressure to 0.35 MPa to separate a LPG gas from the second liquid hydrocarbon stream, where the LPG gas is comprised of low molecular weight hydrocarbons, for example C1-C4 hydrocarbons. The degassed second liquid hydrocarbon stream may be combined with DME lean oil.

The DME lean gas produced by contacting the DME-containing gas, preferably as the high pressure gas mixture, with the first portion of water or brine may be split into a portion for production as natural gas and a portion for recycle to strip the aqueous phase and the oil phase separated from the mixture of DME, crude oil, water and gas. As shown in FIG. 1, the DME lean gas may be split into a portion for production as natural gas and a portion for recycle using a gas splitter valve 182. The ratio of the portion of the DME lean gas portion for recycle and the portion for production as natural gas may be adjusted and controlled from 0.01:1 to 0.8:1 (from 1 vol. % to 80 vol. % of the DME lean gas is recycled), preferably from 0.05:1 to 0.2:1 (5 vol. % to 20 vol. % of the DME lean gas is recycled). As noted above, increasing the gas recycle volume ratio may decrease the DME content in oil produced from the system, and may decrease the DME content in water produced from the water stripper in the system, while increasing the DME content in water produced from the DME absorber. Decreasing the gas recycle volume ratio may decrease the DME content in the DME lean gas. The ratio of the portion of the DME lean gas portion for recycle and the portion for production as natural gas may be adjusted and controlled to obtain the desired gas recycle volume ratio to assist in producing the oil, and/or the natural gas, and/or the produced water having a selected quantity of DME therein.

The recycled portion of the DME lean gas may be expanded to produce an expanded DME lean gas if the DME-containing gas contacted with the first portion of water or brine is a high pressure gas mixture and the DME lean gas produced by contact with the first portion of water or brine is a high pressure DME lean gas. The high pressure DME lean gas may have a pressure of greater than 1 MPa, or from greater than 1 MPa to 4 MPa, or from 2 MPa to 3 MPa, and may be expanded to produce an expanded DME lean gas having a pressure of up to 1 MPa, or from 0.101 MPa to 1 MPa, and preferably is expanded to atmospheric pressure. As shown in FIG. 1, the recycled portion of the high pressure DME lean gas may be expanded in a conventional expander or may be expanded through a Joule-Thomson valve.

The recycled expanded portion of the DME lean gas may be heated to improve the DME stripping effect of the DME lean gas. Heating the recycled expanded DME lean gas may increase the amount of DME separated from the aqueous phase and the amount of DME separated from the oil phase by raising the temperature at which the aqueous phase and the oil phase are contacted with the recycled expanded DME lean gas, which may increase the quantity of DME vaporized by contact of the expanded DME lean gas with the aqueous phase and the oil phase. In one embodiment as shown in FIG. 1, the recycled expanded DME lean gas may be heated by exchanging heat with the compressed stream in a heat exchanger 180. The recycled expanded DME lean gas may also be heated by exchanging heat with the water or brine from the water source 128.

The recycled, preferably expanded and heated, DME lean gas may be split into a first portion for contact with the aqueous phase separated from the mixture of DME, crude oil, water or brine and gas and a second portion for contact with the oil phase separated from the mixture. As shown in FIG. 1, the recycled DME lean gas may be split into first and second portions using an adjustable gas splitter component 240. The amount of the recycled, preferably expanded, DME lean gas separated into the first and second portions, respectively, may be controlled to provide a selected amount of the recycled DME lean gas for stripping the aqueous phase and the oil phase, respectively, based on the relative quantities of the aqueous phase relative to the oil phase, where the volume of the first portion of the recycled DME lean gas provided to strip the aqueous phase and the volume of the second portion of the recycled DME lean gas provided to strip the oil phase may be directly related to the ratio of the volume of the aqueous phase and to the volume of the oil phase. In an embodiment, from 1 vol. % to 80 vol. % of the recycled, preferably expanded, DME lean gas may be provided in the second portion of recycled DME lean gas to strip the oil phase, and from 20 vol. % to 99 vol. % may be provided in the first portion of recycled DME lean gas to strip the aqueous phase. In one embodiment, the ratio of the first and second portions of the recycled DME lean gas may be automatically controlled via a feedback loop, for example monitored and controlled by a computer, to maintain a selected ratio of the first portion of the recycled DME lean gas to the second portion of the recycled DME lean gas or to maintain a selected ratio of the first and second portions based on the ratio of the volume of the aqueous phase to the volume of the oil phase.

The first portion of the recycled, preferably expanded and heated, DME lean gas is contacted with the aqueous phase separated from the mixture of DME, crude oil, water or brine, and gas to produce DME lean water or brine and the first DME enriched gas. The DME lean water or brine contains less DME than the aqueous phase separated from the mixture, and the first DME enriched gas contains more DME than the first portion of the recycled DME lean gas. Contacting the first portion of the recycled DME lean gas with the aqueous phase separated from the mixture separates at least a portion of the DME from the aqueous phase from the mixture into the first portion of the recycled DME lean gas so that the DME lean water or brine produced by the contacting contains less DME than the aqueous phase separated from the mixture and the first enriched DME gas contains more DME than the first portion of the recycled DME lean gas.

The contact of the aqueous phase separated from the mixture and the first portion of the recycled DME lean gas may be controlled to optimize separation of DME from the aqueous phase into the first portion of the recycled DME lean gas. As described above and shown in FIG. 4, the aqueous phase separated from the mixture and the first portion of the recycled DME lean gas may be contacted in the water stripper 114, where the water stripper contains packing in one or more packing beds 411 to enhance contact of the aqueous phase with the first portion of the DME lean gas, thereby enhancing separation of DME from the aqueous phase into the first portion of the recycled DME lean gas. The water stripper 114 may be packed with packing materials in one or more packing beds so that the water stripper has from 6 to 15 theoretical separation stages, or from 8 to 14 theoretical separation stages, where the relative amount of DME separated from the aqueous phase into the first portion of the recycled DME lean gas is directly related to the number of theoretical separation stages produced by the packing.

The aqueous phase separated from the mixture of DME, crude oil, water or brine, and gas may be heated prior to contacting the aqueous phase with the first portion of the recycled DME lean gas to enhance the removal of DME from the aqueous phase into the first portion of the recycled DME lean gas. The aqueous phase separated from the mixture may be heated to a temperature of from 10° C. to 90° C., or more preferably, to a temperature of from 25° C. to 60° C. As shown in FIG. 1 and described above, the aqueous phase separated from the mixture may be heated in a water heating element 154, which may be a heat exchanger or a fired heater or an electrical heater. Preferably, the aqueous phase separated from the mixture is heated in a heat exchanger wherein the aqueous phase is heated by exchanging heat with the compressed stream.

The DME lean water or brine and the first DME enriched gas produced by contact of the aqueous phase separated from the mixture and the first portion of the recycled DME lean gas may be separated. The first enriched DME gas may be separated from the DME lean water or brine by separating the product gas from the liquid phase DME lean water or brine. Preferably, as described above and as shown in FIG. 4, the aqueous phase separated from the mixture is contacted with the first portion of the recycled DME lean gas in a column 401 in a countercurrent flow with the first portion of the recycled DME lean gas bubbling upwards through downcoming aqueous phase, where the first DME enriched gas is produced from the top of the column and the DME lean water or brine is produced from the bottom of the column. The first DME enriched gas may be provided for compression, and subsequently, for use as a portion of the DME-containing gas scrubbed by the first portion of water or brine.

The second portion of the recycled, preferably expanded and heated, DME lean gas is contacted with the oil phase separated from the mixture of DME, crude oil, water or brine, and gas to produce DME lean oil and the second DME enriched gas. The DME lean oil contains less DME than the oil phase separated from the mixture, and the second DME enriched gas contains more DME than the second portion of the recycled DME lean gas. Contacting the second portion of the recycled DME lean gas with the oil phase separated from the mixture separates at least a portion of the DME from the oil phase from the mixture into the second portion of the recycled DME lean gas so that the DME lean oil produced by the contacting contains less DME than the oil phase separated from the mixture and the second enriched DME gas contains more DME than the second portion of the recycled DME lean gas. Preferably, the DME lean oil contains at most 1 ppmwt of DME, and more preferably contains at most 100 ppbwt of DME.

The contact of the oil phase separated from the mixture and the second portion of the recycled DME lean gas may be controlled to optimize separation of DME from the oil phase into the second portion of the recycled DME lean gas. As described above and shown in FIG. 5, the oil phase separated from the mixture and the second portion of the recycled DME lean gas may be contacted in the oil stripper 116, where the oil stripper may contain packing in one or more packing beds 511 to enhance contact of the oil phase with the second portion of the DME lean gas, thereby enhancing separation of DME from the oil phase into the second portion of the recycled DME lean gas. The oil stripper 116 may be packed with packing materials in one or more packing beds so that the oil stripper has from 6 to 20 theoretical separation stages, or from 8 to 14 theoretical separation stages, where the relative amount of DME separated from the oil phase into the second portion of the recycled DME lean gas is directly related to the number of theoretical separation stages produced by the packing.

The oil phase separated from the mixture of DME, crude oil, water or brine, and gas may be heated prior to contacting the oil phase with the second portion of the recycled DME lean gas to enhance the removal of DME from the oil phase into the second portion of the recycled DME lean gas. The oil phase separated from the mixture may be heated to a temperature of from 10° C. to 100° C., or more preferably, to a temperature of from 25° C. to 60° C. As shown in FIG. 1 and described above, the oil phase separated from the mixture may be heated in an oil heating element 260, which may be a heat exchanger or a fired heater or an electrical heater. Preferably, the oil phase separated from the mixture is heated in a heat exchanger wherein the oil phase is heated by exchanging heat with the compressed stream. A small quantity of water sufficient to inhibit scaling may be mixed with the oil phase separated from the mixture if the oil phase is heated prior to introduction into the oil stripper 116, where the water may be added to the oil phase prior to heating, or after heating and prior to introduction into the oil stripper, or after introduction of the oil phase into the oil stripper.

The DME lean oil and the second DME enriched gas produced by contact of the oil phase separated from the mixture and the second portion of the recycled DME lean gas may be separated. The second enriched DME gas may be separated from the DME lean oil by separating the product gas from the liquid phase DME lean oil. Preferably, as described above and as shown in FIG. 5, the oil phase separated from the mixture is contacted with the second portion of the recycled DME lean gas in a column 501 in a countercurrent flow with the second portion of the recycled DME lean gas bubbling upwards through downcoming oil phase, where the second DME enriched gas is produced from the top of the column and the DME lean oil is produced from the bottom of the column. The second DME enriched gas may be provided for compression, and subsequently, for use as a portion of the DME-containing gas scrubbed by the first portion of water or brine. The produced DME lean oil may be transported to a refinery for refining into various petroleum products including transportation fuels and chemicals. Optionally, as described above, the liquid petroleum gas produced by contact of the first liquid hydrocarbon stream, and optionally the combined first and third liquid hydrocarbon streams, with the second portion of water or brine may be combined with the DME lean oil.

Referring now to FIG. 6, in an embodiment of the process of the present invention the mixture of DME, crude oil, water or brine, and gas comprising alkane hydrocarbons may be provided by producing the mixture from an oil-bearing formation 606. The mixture may be produced from the oil-bearing formation through a first well 602 that extends into the oil-bearing formation 606. The mixture may be provided from the first well 602 for separation into the gas comprising DME and alkane hydrocarbons, the oil phase comprised of DME and crude oil, and the aqueous phase comprised of DME and water or brine. In a particularly preferred embodiment of the process of the present invention, an enhanced oil recovery formulation comprising DME is injected into the oil-bearing formation 606 via a second well 604 to enhance recovery of oil from the formation. At least a portion of the DME produced from the oil-bearing formation via the first well may be DME injected into the formation for enhanced oil recovery via the second well. At least a portion of the first aqueous stream comprising DME and water or brine, or the second aqueous stream aqueous stream comprising DME and water or brine, or the third aqueous stream comprising DME and water or brine, or combinations thereof may be injected into the oil-bearing formation to enhance recovery of oil from the oil-bearing formation. Referring to FIG. 7, the first well may be contained in a first well group 702, where the mixture may be produced from wells of the first well group, and the second well may be contained in a second well group, where an enhanced oil recovery formulation comprising DME may be injected into the oil-bearing formation by wells of the second well group.

Figure 8:
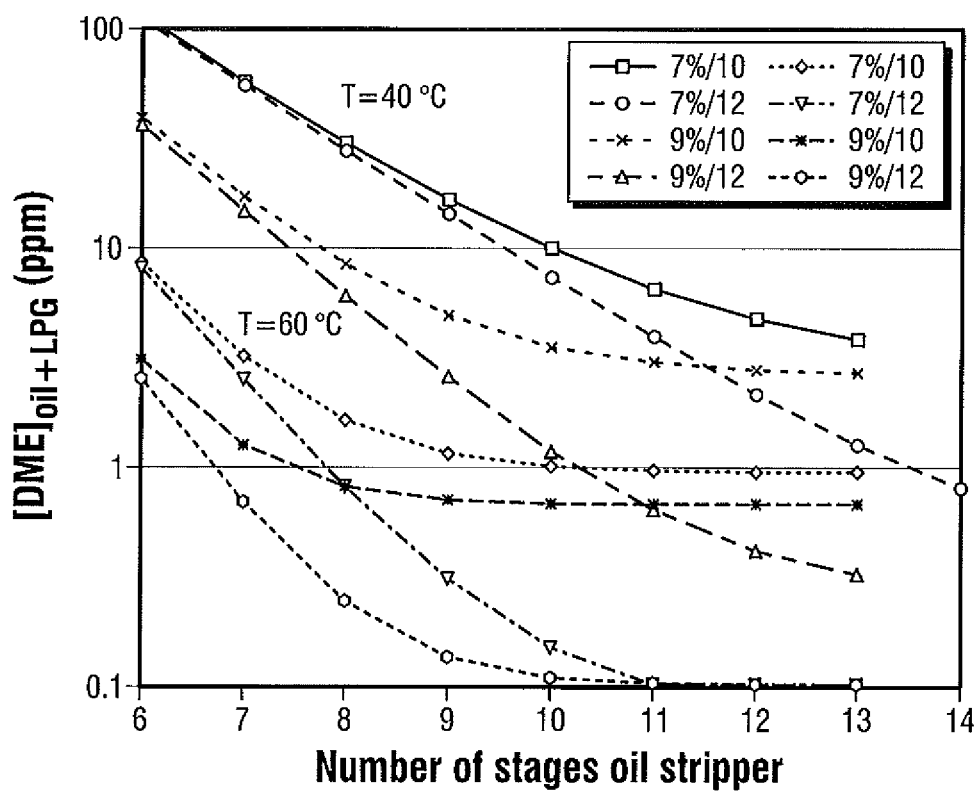
FIG. 8 is a chart showing the temperature dependence on DME removal according to an embodiment of the present disclosure.

FIG. 8 shows the effect of heating the oil phase prior to contacting the oil phase with the second portion of the recycled DME lean gas on the separation of DME from the oil phase in the DME lean oil product. A significant difference in the amount of DME present in the DME lean oil product may be obtained by increasing the temperature of the oil phase prior to contacting the oil phase with the second portion of recycled DME lean gas. For example, FIG. 8 shows data of two separate process runs in which the oil phase was heated to 40° C. or 60° C., at two different ratios of the second portion of recycled DME lean gas to the total DME lean gas produced by washing the DME-containing gas with the first portion of water or brine, and at two different number of theoretical separation stages of the gas absorber. When the oil phase is heated to 40° C., in order to obtain a concentration of DME less than 1 ppmwt a minimum of 11 theoretical separation stages must be employed when contacting the oil phase with the second portion of the recycled DME lean gas. In contrast, when oil phase is heated to 60° C., the number of theoretical separation stages required to produce a DME lean oil having a DME concentration of less than 1 ppmwt is reduced to a minimum of 7. As such, using a temperature of 60° C. reduces the time and resources needed to separate DME from the oil phase.

FIG. 8 also shows the difference in DME separation efficiency from the oil phase based on the number of theoretical separation stages for separation of DME from the DME-containing gas comprised of the gas separated from the mixture of DME, crude oil, water or brine, and a gas when washed with the first portion of water or brine. In all instances, when 12 theoretical separation stages are used, the DME concentration in the DME lean oil is lower than when 10 stages are used. In addition, the data also show an increase in DME removal efficacy when a larger amount of recycled DME lean gas is used to strip the oil phase. In all instances, a 9% ratio of the second portion of recycled DME lean gas to the total DME lean gas produced by washing the DME-containing gas with the first portion of water or brine results in greater DME removal than a 7% ratio.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. While systems and methods are described in terms of "comprising," "containing," or "including" various components or steps, the compositions and methods can also "consist essentially of" or "consist of" the various components and steps. Whenever a numerical range with a lower limit and an upper limit is disclosed, any number and any included range falling within the range is specifically disclosed. In particular, every range of values (of the form, "from a to b," or, equivalently, "from a-b") disclosed herein is to be understood to set forth every number and range encompassed within the broader range of values. Whenever a numerical range having a specific lower limit only, a specific upper limit only, or a specific upper limit and a specific lower limit is disclosed, the range also includes any numerical value "about" the specified lower limit and/or the specified upper limit. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces.

What is claimed is:

1. A system comprising:
a gas-oil-water separation module, a dimethyl ether (DME) absorber, a water stripper, a liquid-liquid extractor, a water source, and an oil stripper, wherein:
the gas-oil-water separation module is configured to receive a mixture comprised of DME, crude oil, water or brine, and a gas comprising alkane hydrocarbons and is further configured to separate from the mixture: a gas comprising DME and alkane hydrocarbons, an oil phase comprising crude oil and DME, and an aqueous phase comprising water or brine and DME;
the water stripper is operatively fluidly coupled to the gas-oil-water separation module configured to receive the separated aqueous phase therefrom, and the water stripper also is operatively fluidly coupled to the DME absorber to receive a first portion of a DME lean gas therefrom, the water stripper being configured to contact the separated aqueous phase received therein with the DME lean gas received therein to produce a DME lean water or brine containing less DME than the separated aqueous phase received therein and a first DME enriched gas containing more DME than the DME lean gas received therein, wherein the water stripper is operatively fluidly coupled to the DME absorber to provide the first DME enriched gas to the DME absorber;
the oil stripper is operatively fluidly coupled to the gas-oil-water separation module and is configured to receive the separated oil phase therefrom, the oil stripper also being operatively fluidly coupled to the DME absorber to receive a second portion of the DME lean gas therefrom, the oil stripper being configured to contact the separated oil phase received therein with the DME lean gas received therein to produce oil containing less DME than the separated oil phase received therein and to produce a second DME enriched gas containing more DME than the DME lean gas received therein, wherein the oil stripper is fluidly operatively coupled to the DME absorber to provide the second DME enriched gas to the DME absorber;

the DME absorber is operatively fluidly coupled to: the gas-water-oil separation module to receive at least a portion of the gas comprising DME and alkane hydrocarbons therefrom; the water stripper to receive at least a portion of the first DME enriched gas therefrom; the oil stripper to receive at least a portion of the second DME enriched gas therefrom; and the water source to receive water from the water source, wherein the DME absorber is configured to contact the gas comprising DME and alkane hydrocarbons from the gas-oil-water separation module and the first and second DME enriched gases with water from the water source to produce: the DME lean gas, wherein the DME lean gas contains less DME than the gas provided from the gas-oil-water separation module; a DME absorber aqueous stream comprising water or brine and DME, wherein the DME absorber aqueous stream contains more DME than the water or brine received by the DME absorber from the water source; and a DME absorber liquid hydrocarbon stream comprising DME and alkane hydrocarbons;

the liquid-liquid extractor (LLE) is operatively fluidly coupled to the DME absorber to receive the DME absorber liquid hydrocarbon stream from the DME absorber, and is operatively fluidly coupled to the water source to receive water or brine from the water source, the LLE being configured to contact the DME absorber liquid hydrocarbon stream and the water or brine received therein to produce a LLE liquid hydrocarbon stream and a LLE aqueous stream, wherein the LLE hydrocarbon stream is comprised of alkane hydrocarbons and contains less DME than the DME absorber liquid hydrocarbon stream provided to the LLE, and wherein the LLE aqueous stream is comprised of DME and water or brine.

2. The system of claim 1, further comprising an oil heating element operatively fluidly coupled to the gas-water-oil separation module and configured to receive the separated oil phase from the gas-oil-water separation module and further configured to heat the separated oil phase, the oil heating element being further operatively fluidly coupled to the oil stripper to provide the heated separated oil phase to the oil stripper.

3. The system of claim 1, further comprising a water flow splitter component operatively fluidly coupled to the water source, to the DME absorber, and to the LLE, the water flow splitter component being configured to receive water from the water source and to split the water from the water source into a first portion and a second portion, and to provide the first portion of water to the DME absorber and to provide the second portion of water to the LLE.

4. The system of claim 1, further comprising a first well operatively fluidly coupled to an oil-bearing formation and configured to produce the mixture of DME, oil, water, and gas from the formation, wherein the first well is operatively fluidly coupled to the gas-oil-water separation module to provide the mixture of DME, oil, water, and gas to the gas-oil-water separation module.

5. The system of claim 4, further comprising a second well operatively fluidly coupled to the LLE to receive the LLE aqueous stream therefrom, wherein the second well is operatively fluidly coupled to the oil-bearing formation and is configured to inject the LLE aqueous stream into the oil-bearing formation.

6. The system of claim 1, further comprising:
a compressor, a high pressure separator, and a means for expanding gas, wherein:
the compressor is operatively fluidly coupled to: the gas-oil-water separation module; the high pressure separator; the oil stripper; and the water stripper, and is configured to receive: the gas comprising DME and alkane hydrocarbons from the gas-oil-water separation module; the first DME enriched gas from the water stripper; and the second DME enriched gas from the oil stripper, and is further configured to compress at least a part of the gas comprising DME and alkane hydrocarbons from the gas-oil-water separation module, at least a part of the first DME enriched gas, and at least a part of the second DME enriched gas to produce a compressed stream comprising the part of the gas comprising DME and alkane hydrocarbons from the gas-oil-water separation module, the part of the first DME enriched gas, and the part of the second DME enriched gas;
the high pressure separator is operatively fluidly coupled to the compressor to receive the compressed stream therefrom, and is configured to separate from the compressed stream a high pressure gas mixture comprised of DME and alkane hydrocarbons, a high pressure separator aqueous stream, and a high pressure separator liquid hydrocarbon stream wherein the high pressure gas mixture has a greater pressure than the gas comprising DME and alkane hydrocarbons from the gas-oil-water separation module, the first DME enriched gas, and the second DME enriched gas, and wherein the high pressure separator aqueous stream is comprised of DME and water or brine and the high pressure separator liquid hydrocarbon stream is comprised of DME and alkane hydrocarbons, and wherein the high pressure separator is operatively fluidly coupled to the DME absorber to provide the high pressure gas mixture to the DME absorber, wherein the gas comprising DME and alkane hydrocarbons received by the DME absorber from the gas-oil-water separation module is the high pressure gas mixture; and
the means for expanding gas is operatively fluidly coupled to the DME absorber to receive the DME lean gas therefrom and is configured to expand the DME lean gas, and is operatively fluidly coupled to the water stripper to provide a first portion of the DME lean gas to the water stripper and is operatively fluidly coupled to the oil stripper to provide a second portion of the DME lean gas to the oil stripper, wherein the DME lean gas received by the means for expanding gas from the DME absorber is a high pressure DME lean gas and the DME lean gas provided from the means for expanding gas to the oil stripper and to the water stripper is an expanded DME lean gas that has a lower pressure than the high pressure DME lean gas.

7. The system of claim 6, further comprising a first adjustable gas splitter component operatively fluidly coupled to: the means for expanding gas; the water stripper; and the oil stripper, the first adjustable gas splitter component being configured to receive the expanded DME lean gas from the means for expanding gas and to split the expanded DME lean gas into a first portion and a second portion, and to provide the first portion of the expanded DME lean gas to the water stripper and to provide the second portion of the expanded DME lean gas to the oil stripper, wherein the first adjustable gas splitter component is configured to be adjusted to adjust the amount of the expanded DME lean gas split into the first portion of the expanded DME lean gas and into the second portion of the expanded DME lean gas.

8. The system of claim 6, further comprising a heat exchanger operatively fluidly coupled to: the compressor, the high pressure separator, the means for expanding gas; the water stripper; and the oil stripper, the heat exchanger being configured to receive: the compressed stream from the compressor; and the expanded DME lean gas from the means for expanding gas and being further configured to effect exchange of heat between the compressed stream and the expanded DME lean gas to cool the compressed stream and to heat the expanded DME lean gas, and being further configured to provide the cooled compressed stream to the high pressure separator and to provide the heated expanded DME lean gas to the water stripper and to the oil stripper.

9. The system of claim 6, wherein the LLE is operatively fluidly coupled to the high pressure separator to receive the high pressure separator liquid hydrocarbon stream therefrom, and wherein the LLE is a multistage countercurrent liquid-liquid extractor configured to contact the high pressure separator liquid hydrocarbon stream and the DME absorber liquid hydrocarbon stream with the water from the water source in a countercurrent flow.

10. The system of claim 6, wherein the compressor is a multi-stage compressor.

11. A process, comprising:
  providing a mixture comprised of dimethyl ether (DME), crude oil, water or brine, and a gas comprised of alkane hydrocarbons;
  separating from the mixture: a gas comprised of DME and alkane hydrocarbons; an oil phase comprised of DME and crude oil, and an aqueous phase comprised of DME and water or brine;
  contacting at least a portion of the separated gas comprised of DME and alkane hydrocarbons, a first DME enriched gas, and a second DME enriched gas with a first portion of water or brine to produce: a DME lean gas comprising alkane hydrocarbons, a first aqueous stream comprising DME and water or brine, and a first liquid hydrocarbon stream comprising DME and alkane hydrocarbons, wherein the DME lean gas contains less DME than the gas comprised of DME and alkane hydrocarbons, and the first aqueous stream contains more DME than the water or brine contacted with the gas separated from the mixture;
  contacting the first liquid hydrocarbon stream with a second portion of water or brine to produce a second liquid hydrocarbon stream comprising alkane hydrocarbons and a second aqueous stream comprising DME and water or brine, wherein the second liquid hydrocarbon stream contains less DME than the first liquid hydrocarbon stream;
  contacting the aqueous phase separated from the mixture with a first portion of the DME lean gas to produce DME lean water or brine and the first DME enriched gas, wherein the DME lean water or brine contains less DME than the aqueous phase separated from the mixture and the first DME enriched gas contains more DME than the DME lean gas; and
  contacting the oil phase separated from the mixture with a second portion of the DME lean gas to produce DME lean oil and the second DME enriched gas, wherein the DME lean oil contains less DME than the oil phase separated from the mixture and the second DME enriched gas contains more DME than the DME lean gas.

12. The process of claim 11, further comprising heating the oil phase separated from the mixture prior to contacting the oil phase with the second portion of the DME lean gas.

13. The process of claim 11, further comprising heating the aqueous phase separated from the mixture prior to contacting the aqueous phase with the first portion of the DME lean gas.

14. The process of claim 11, further comprising producing the mixture from an oil-bearing formation.

15. The process of claim 11, further comprising injecting the first aqueous stream or the second aqueous stream into an oil-bearing formation.

16. The process of claim 11, further comprising the steps of:
  compressing at least a portion of the separated gas comprised of DME and alkane hydrocarbons, at least a portion of the first enriched DME gas, and at least a portion of the second DME enriched gas to produce a compressed stream;
  separating the compressed stream in a high pressure separator into a high pressure gas mixture, a third liquid hydrocarbon stream and a third aqueous stream, wherein: the high pressure gas mixture has a greater pressure than the separated gas comprised of DME and alkane hydrocarbons, the first DME enriched gas, and the second DME enriched gas; the third liquid hydrocarbon stream comprises DME and alkane hydrocarbons; and the third aqueous stream comprises DME and water or brine, wherein the high pressure gas mixture contains the portion of the separated gas comprised of DME and alkane hydrocarbons that is contacted with water or brine;
  expanding the DME lean gas to produce an expanded DME lean gas, wherein: the DME lean gas is a high pressure DME lean gas, the expanded DME lean gas has a lower pressure than the DME lean gas, the portion of DME lean gas contacted with the oil phase separated from the mixture is a portion of the expanded DME lean gas, and the portion of the DME lean gas contacted with the aqueous phase separated from the mixture is a portion of the expanded DME lean gas.

17. The process of claim 16, wherein the third liquid hydrocarbon stream and the first liquid hydrocarbon stream are contacted with water or brine to produce the second liquid hydrocarbon stream and the second aqueous stream.

18. The process of claim 16, further comprising exchanging heat between the compressed stream and the expanded DME lean gas to cool the compressed stream and to heat the expanded DME lean gas prior to contacting the expanded DME lean gas with the aqueous phase separated from the mixture or the oil phase separated from the mixture.

* * * * *